United States Patent
Yang

(10) Patent No.: US 10,254,911 B2
(45) Date of Patent: Apr. 9, 2019

(54) DEVICE CONFIGURATION USER INTERFACE

(71) Applicant: Apple Inc., Cupertino, CA (US)

(72) Inventor: Lawrence Y. Yang, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 626 days.

(21) Appl. No.: 14/839,903

(22) Filed: Aug. 28, 2015

(65) Prior Publication Data

US 2016/0260414 A1 Sep. 8, 2016

Related U.S. Application Data

(60) Provisional application No. 62/129,947, filed on Mar. 8, 2015.

(51) Int. Cl.
*G09G 5/12* (2006.01)
*G06F 3/0481* (2013.01)
(Continued)

(52) U.S. Cl.
CPC ............ *G06F 3/0481* (2013.01); *G06F 1/163* (2013.01); *G06F 3/0484* (2013.01);
(Continued)

(58) Field of Classification Search
CPC ....... H04W 4/008; H04W 84/12; H04W 4/02; H04W 4/021; H04W 4/023; H04W 4/025;
(Continued)

(56) References Cited

U.S. PATENT DOCUMENTS 4,803,487 A 2/1989 Willard et al.
5,617,031 A 4/1997 Tuttle
(Continued)

FOREIGN PATENT DOCUMENTS

AU 2016100796 A4 6/2016
CN 101730907 A 6/2010
(Continued)

OTHER PUBLICATIONS

Office Action received for Australian Patent Application No. 2017100070, dated Mar. 16, 2017, 6 pages.
(Continued)

*Primary Examiner* — Tadesse Hailu
(74) *Attorney, Agent, or Firm* — Dentons US LLP

(57) ABSTRACT

The present disclosure relates to device configuration user interfaces. A first electronic device with a first touch-sensitive display is in a paired relationship with a remote second electronic device with a second display. The first device displays a user interface that includes one or more representations of locations on the second display. The first device detects a user input on the first display at a representation of a first location on the second display, where the representation of the first location includes an affordance. The first device detects movement of the user input from the representation of the first location to a representation of a second location on the second display. In response to detecting the movement of the user input from the representation of the first location to the representation of the second location, the first device associates the affordance with the second location on the second display.

39 Claims, 26 Drawing Sheets

(51) Int. Cl.
*G06F 3/0488* (2013.01)
*G06F 3/0484* (2013.01)
*G06F 3/14* (2006.01)
*G06F 1/16* (2006.01)
*H04M 1/2745* (2006.01)
*H04M 1/725* (2006.01)

(52) U.S. Cl.
CPC ........ *G06F 3/0488* (2013.01); *G06F 3/04817* (2013.01); *G06F 3/04842* (2013.01); *G06F 3/04845* (2013.01); *G06F 3/04883* (2013.01); *G06F 3/1454* (2013.01); *G09G 5/12* (2013.01); *H04M 1/27455* (2013.01); *H04M 1/7253* (2013.01); *H04M 2250/02* (2013.01); *H04M 2250/22* (2013.01)

(58) Field of Classification Search
CPC .. H04W 48/04; G06F 3/0481; G06F 3/04817; G06F 3/0484; G06F 3/04842; G06F 3/04845; G06F 3/04883; G09G 5/12
See application file for complete search history.

(56) References Cited

U.S. PATENT DOCUMENTS

| | | | |
|---|---|---|---|
| 5,853,327 | A | 12/1998 | Gilboa |
| 6,167,353 | A | 12/2000 | Piernot et al. |
| 6,190,174 | B1 | 2/2001 | Lam et al. |
| 6,323,846 | B1 | 11/2001 | Westerman et al. |
| 6,398,646 | B1 | 6/2002 | Wei et al. |
| 6,570,557 | B1 | 5/2003 | Westerman et al. |
| 6,677,932 | B1 | 1/2004 | Westerman |
| 6,889,138 | B1 | 5/2005 | Krull et al. |
| 7,081,905 | B1 | 7/2006 | Raghunath |
| 7,130,664 | B1 | 10/2006 | Williams |
| 7,305,350 | B1 | 12/2007 | Bruecken |
| 7,614,008 | B2 | 11/2009 | Ording |
| 7,633,076 | B2 | 12/2009 | Huppi et al. |
| 7,644,019 | B2 | 1/2010 | Woda et al. |
| 7,653,883 | B2 | 1/2010 | Hotelling et al. |
| 7,657,849 | B2 | 2/2010 | Chaudhri et al. |
| 7,663,607 | B2 | 2/2010 | Hotelling et al. |
| 7,843,471 | B2 | 11/2010 | Doan et al. |
| 7,844,914 | B2 | 11/2010 | Andre et al. |
| 7,890,422 | B1 | 2/2011 | Hirka et al. |
| 7,957,762 | B2 | 6/2011 | Herz et al. |
| 8,006,002 | B2 | 8/2011 | Kalayjian et al. |
| 8,050,997 | B1 | 11/2011 | Nosek et al. |
| 8,195,507 | B2 | 6/2012 | Postrel |
| 8,239,784 | B2 | 8/2012 | Hotelling et al. |
| 8,279,180 | B2 | 10/2012 | Hotelling et al. |
| 8,381,135 | B2 | 2/2013 | Hotelling et al. |
| 8,392,259 | B2 | 3/2013 | MacGillivray et al. |
| 8,453,940 | B2 | 6/2013 | Diamond |
| 8,479,122 | B2 | 7/2013 | Hotelling et al. |
| 8,706,628 | B2 | 4/2014 | Phillips |
| 8,763,896 | B2 | 7/2014 | Kushevsky et al. |
| 8,831,677 | B2 | 9/2014 | Villa-Real |
| 8,892,474 | B1 | 11/2014 | Inskeep et al. |
| 8,894,462 | B2 | 11/2014 | Huang et al. |
| 8,931,703 | B1 | 1/2015 | Mullen et al. |
| 8,983,539 | B1* | 3/2015 | Kim .................. G06F 3/1454 345/2.3 |
| 9,324,067 | B2 | 4/2016 | Van Os et al. |
| 9,405,766 | B2 | 8/2016 | Robbin et al. |
| 9,483,763 | B2 | 11/2016 | Van Os et al. |
| 9,547,419 | B2 | 1/2017 | Yang et al. |
| 9,574,896 | B2 | 2/2017 | McGavran et al. |
| 9,628,950 | B1 | 4/2017 | Noeth et al. |
| 9,652,741 | B2 | 5/2017 | Goldberg et al. |
| 2002/0015024 | A1 | 2/2002 | Westerman et al. |
| 2002/0029169 | A1 | 3/2002 | Oki et al. |
| 2002/0087262 | A1 | 7/2002 | Bullock et al. |
| 2003/0128237 | A1* | 7/2003 | Sakai .................. G06F 3/0481 715/748 |
| 2003/0151982 | A1* | 8/2003 | Brewer .................. G04G 21/00 368/46 |
| 2003/0171984 | A1 | 9/2003 | Wodka et al. |
| 2003/0200184 | A1 | 10/2003 | Dominguez et al. |
| 2004/0044953 | A1 | 3/2004 | Watkins et al. |
| 2004/0100389 | A1 | 5/2004 | Naito et al. |
| 2004/0254891 | A1 | 12/2004 | Blinn et al. |
| 2005/0117601 | A1 | 6/2005 | Anderson et al. |
| 2005/0187873 | A1 | 8/2005 | Labrou et al. |
| 2005/0190059 | A1 | 9/2005 | Wehrenberg |
| 2005/0191159 | A1 | 9/2005 | Benko |
| 2005/0237194 | A1 | 10/2005 | VoBa |
| 2006/0000900 | A1 | 1/2006 | Fernandes et al. |
| 2006/0017692 | A1 | 1/2006 | Wehrenberg et al. |
| 2006/0025923 | A1 | 2/2006 | Dotan et al. |
| 2006/0026536 | A1 | 2/2006 | Hotelling et al. |
| 2006/0033724 | A1 | 2/2006 | Chaudhri et al. |
| 2006/0079973 | A1 | 4/2006 | Bacharach |
| 2006/0135064 | A1 | 6/2006 | Cho et al. |
| 2006/0165060 | A1 | 7/2006 | Dua |
| 2006/0197753 | A1 | 9/2006 | Hotelling |
| 2006/0294025 | A1 | 12/2006 | Mengerink |
| 2007/0096283 | A1 | 5/2007 | Ljung et al. |
| 2007/0096765 | A1 | 5/2007 | Kagan |
| 2007/0188409 | A1 | 8/2007 | Repetto et al. |
| 2007/0194113 | A1 | 8/2007 | Esplin et al. |
| 2007/0226778 | A1 | 9/2007 | Pietruszka |
| 2007/0254712 | A1 | 11/2007 | Chitti |
| 2008/0016443 | A1 | 1/2008 | Hiroshima et al. |
| 2008/0027947 | A1 | 1/2008 | Pritchett et al. |
| 2008/0040265 | A1 | 2/2008 | Rackley, III et al. |
| 2008/0040786 | A1 | 2/2008 | Chang |
| 2008/0041936 | A1 | 2/2008 | Vawter |
| 2008/0077673 | A1 | 3/2008 | Thomas |
| 2008/0120029 | A1 | 5/2008 | Zelek et al. |
| 2008/0165136 | A1 | 7/2008 | Christie et al. |
| 2008/0214191 | A1 | 9/2008 | Yach et al. |
| 2008/0292074 | A1 | 11/2008 | Boni et al. |
| 2008/0320391 | A1 | 12/2008 | Lemay et al. |
| 2009/0036165 | A1 | 2/2009 | Brede |
| 2009/0037326 | A1 | 2/2009 | Chitti et al. |
| 2009/0057396 | A1 | 3/2009 | Barbour et al. |
| 2009/0088207 | A1 | 4/2009 | Sweeney et al. |
| 2009/0195402 | A1 | 8/2009 | Izadi et al. |
| 2009/0199130 | A1 | 8/2009 | Tsern et al. |
| 2009/0203315 | A1 | 8/2009 | Kawabata et al. |
| 2009/0207743 | A1* | 8/2009 | Huq .................. H04L 12/2697 370/250 |
| 2009/0210308 | A1 | 8/2009 | Toomer et al. |
| 2009/0222748 | A1 | 9/2009 | Lejeune et al. |
| 2009/0325630 | A1 | 12/2009 | Tiitola et al. |
| 2010/0082481 | A1 | 4/2010 | Lin et al. |
| 2010/0114731 | A1 | 5/2010 | Kingston et al. |
| 2010/0131190 | A1 | 5/2010 | Terauchi et al. |
| 2010/0149090 | A1 | 6/2010 | Morris et al. |
| 2010/0153265 | A1 | 6/2010 | Hershfield et al. |
| 2010/0185446 | A1 | 7/2010 | Homma et al. |
| 2010/0223145 | A1 | 9/2010 | Dragt |
| 2010/0267362 | A1 | 10/2010 | Smith et al. |
| 2010/0272250 | A1 | 10/2010 | Yap et al. |
| 2010/0287513 | A1 | 11/2010 | Singh et al. |
| 2011/0059769 | A1 | 3/2011 | Brunolli |
| 2011/0078025 | A1 | 3/2011 | Shrivastav |
| 2011/0081860 | A1 | 4/2011 | Brown et al. |
| 2011/0099079 | A1 | 4/2011 | White |
| 2011/0153628 | A1* | 6/2011 | Basu .................. G06Q 30/02 707/758 |
| 2011/0159959 | A1 | 6/2011 | Mallinson et al. |
| 2011/0251892 | A1 | 10/2011 | Laracey |
| 2012/0036029 | A1 | 2/2012 | Esplin et al. |
| 2012/0036556 | A1 | 2/2012 | LeBeau et al. |
| 2012/0071146 | A1* | 3/2012 | Shrivastava ....... G06F 17/30893 455/414.3 |
| 2012/0078751 | A1 | 3/2012 | MacPhail et al. |
| 2012/0084210 | A1 | 4/2012 | Farahmand |
| 2012/0089300 | A1 | 4/2012 | Wolterman |
| 2012/0089507 | A1 | 4/2012 | Zhang et al. |
| 2012/0116669 | A1 | 5/2012 | Lee et al. |
| 2012/0123937 | A1 | 5/2012 | Spodak |

(56) References Cited

U.S. PATENT DOCUMENTS

| | | |
|---|---|---|
| 2012/0191603 A1 | 7/2012 | Nuzzi |
| 2012/0192094 A1 | 7/2012 | Goertz |
| 2012/0198531 A1 | 8/2012 | Ort et al. |
| 2012/0221464 A1 | 8/2012 | Pasquero et al. |
| 2012/0236037 A1 | 9/2012 | Lessing et al. |
| 2012/0245985 A1 | 9/2012 | Cho et al. |
| 2012/0284297 A1 | 11/2012 | Aguera-Arcas et al. |
| 2012/0287290 A1 | 11/2012 | Jain |
| 2012/0290449 A1 | 11/2012 | Mullen et al. |
| 2012/0303268 A1 | 11/2012 | Su et al. |
| 2012/0310760 A1 | 12/2012 | Phillips et al. |
| 2012/0316777 A1 | 12/2012 | Kitta |
| 2012/0322370 A1 | 12/2012 | Lee |
| 2012/0322371 A1 | 12/2012 | Lee |
| 2013/0047034 A1 | 2/2013 | Salomon et al. |
| 2013/0065482 A1 | 3/2013 | Trickett |
| 2013/0076591 A1 | 3/2013 | Sirpal et al. |
| 2013/0080272 A1 | 3/2013 | Ronca et al. |
| 2013/0080275 A1 | 3/2013 | Ronca et al. |
| 2013/0085931 A1 | 4/2013 | Runyan |
| 2013/0103519 A1 | 4/2013 | Kountotsis et al. |
| 2013/0106603 A1 | 5/2013 | Weast et al. |
| 2013/0110719 A1 | 5/2013 | Carter et al. |
| 2013/0115932 A1 | 5/2013 | Williams et al. |
| 2013/0124423 A1 | 5/2013 | Fisher |
| 2013/0125016 A1* | 5/2013 | Pallakoff ............ G06F 3/04817 |
| | | 715/748 |
| 2013/0134212 A1 | 5/2013 | Chang |
| 2013/0141325 A1 | 6/2013 | Bailey |
| 2013/0141331 A1 | 6/2013 | Shiu et al. |
| 2013/0166679 A1 | 6/2013 | Kuwahara |
| 2013/0189963 A1 | 7/2013 | Epp et al. |
| 2013/0200146 A1 | 8/2013 | Moghadam |
| 2013/0218721 A1 | 8/2013 | Borhan et al. |
| 2013/0219285 A1 | 8/2013 | Iwasaki |
| 2013/0219303 A1* | 8/2013 | Eriksson ............... G06F 3/1454 |
| | | 715/759 |
| 2013/0244615 A1 | 9/2013 | Miller |
| 2013/0246202 A1 | 9/2013 | Tobin |
| 2013/0254574 A1 | 9/2013 | Zacchio et al. |
| 2013/0304651 A1 | 11/2013 | Smith |
| 2013/0322665 A1 | 12/2013 | Bennett et al. |
| 2013/0332358 A1 | 12/2013 | Zhao |
| 2013/0332364 A1 | 12/2013 | Templeton et al. |
| 2013/0339436 A1 | 12/2013 | Gray |
| 2013/0345975 A1 | 12/2013 | Vulcano et al. |
| 2013/0346273 A1 | 12/2013 | Stockton et al. |
| 2013/0346882 A1 | 12/2013 | Shiplacoff et al. |
| 2014/0003597 A1 | 1/2014 | Lazaridis et al. |
| 2014/0006285 A1 | 1/2014 | Chi et al. |
| 2014/0006949 A1 | 1/2014 | Briand et al. |
| 2014/0015546 A1 | 1/2014 | Frederick |
| 2014/0025513 A1 | 1/2014 | Cooke et al. |
| 2014/0058860 A1 | 2/2014 | Roh et al. |
| 2014/0058935 A1 | 2/2014 | Mijares |
| 2014/0064155 A1 | 3/2014 | Evans |
| 2014/0068751 A1 | 3/2014 | Last |
| 2014/0073252 A1 | 3/2014 | Lee et al. |
| 2014/0074716 A1 | 3/2014 | Ni |
| 2014/0074717 A1 | 3/2014 | Evans |
| 2014/0081854 A1 | 3/2014 | Sanchez et al. |
| 2014/0084857 A1 | 3/2014 | Liu et al. |
| 2014/0094124 A1 | 4/2014 | Dave et al. |
| 2014/0094143 A1 | 4/2014 | Ayotte |
| 2014/0101056 A1 | 4/2014 | Wendling |
| 2014/0122331 A1 | 5/2014 | Vaish et al. |
| 2014/0128035 A1 | 5/2014 | Sweeney |
| 2014/0129435 A1 | 5/2014 | Pardo et al. |
| 2014/0129441 A1 | 5/2014 | Blanco et al. |
| 2014/0134947 A1 | 5/2014 | Stouder-Studenmund |
| 2014/0142851 A1 | 5/2014 | Larmo et al. |
| 2014/0143145 A1 | 5/2014 | Kortina et al. |
| 2014/0143737 A1 | 5/2014 | Mistry et al. |
| 2014/0149198 A1 | 5/2014 | Kim et al. |
| 2014/0155031 A1 | 6/2014 | Lee et al. |
| 2014/0160033 A1* | 6/2014 | Brikman ............ G06F 3/04845 |
| | | 345/173 |
| 2014/0164241 A1 | 6/2014 | Neuwirth |
| 2014/0167986 A1 | 6/2014 | Parada et al. |
| 2014/0173455 A1* | 6/2014 | Shimizu ................. H04L 67/06 |
| | | 715/748 |
| 2014/0180582 A1 | 6/2014 | Pontarelli et al. |
| 2014/0187163 A1 | 7/2014 | Fujita |
| 2014/0188673 A1 | 7/2014 | Graham et al. |
| 2014/0191715 A1 | 7/2014 | Wechlin et al. |
| 2014/0237389 A1 | 8/2014 | Ryall et al. |
| 2014/0244495 A1 | 8/2014 | Davis et al. |
| 2014/0273975 A1* | 9/2014 | Barat ................ G06F 15/17312 |
| | | 455/412.2 |
| 2014/0279442 A1 | 9/2014 | Luoma et al. |
| 2014/0279497 A1 | 9/2014 | Qainn-Macianni et al. |
| 2014/0279556 A1 | 9/2014 | Priebatsch et al. |
| 2014/0320387 A1 | 10/2014 | Eriksson et al. |
| 2014/0337207 A1 | 11/2014 | Zhang et al. |
| 2014/0337450 A1 | 11/2014 | Choudhary et al. |
| 2014/0337748 A1* | 11/2014 | Lee ....................... G06F 3/1454 |
| | | 715/740 |
| 2014/0343843 A1 | 11/2014 | Yanku |
| 2014/0359454 A1 | 12/2014 | Lee et al. |
| 2014/0359481 A1* | 12/2014 | Dawson ................ G06Q 10/10 |
| | | 715/753 |
| 2014/0365113 A1 | 12/2014 | McGavran et al. |
| 2014/0370807 A1 | 12/2014 | Lei et al. |
| 2015/0006376 A1 | 1/2015 | Nuthulapati et al. |
| 2015/0012425 A1 | 1/2015 | Mathew |
| 2015/0017956 A1 | 1/2015 | Jeong |
| 2015/0039494 A1 | 2/2015 | Sinton et al. |
| 2015/0044965 A1 | 2/2015 | Kannon et al. |
| 2015/0051846 A1 | 2/2015 | Masuya |
| 2015/0058146 A1 | 2/2015 | Gaddam et al. |
| 2015/0061972 A1 | 3/2015 | Seo et al. |
| 2015/0065035 A1 | 3/2015 | Kim et al. |
| 2015/0066758 A1 | 3/2015 | DeNardis et al. |
| 2015/0067580 A1 | 3/2015 | Um et al. |
| 2015/0094031 A1 | 4/2015 | Liu |
| 2015/0121405 A1 | 4/2015 | Ekselius et al. |
| 2015/0127539 A1 | 5/2015 | Ye et al. |
| 2015/0257004 A1 | 9/2015 | Shanmugam et al. |
| 2015/0287403 A1* | 10/2015 | Holzer Zaslansky ...................... |
| | | G06T 13/205 |
| | | 704/231 |
| 2015/0339652 A1 | 11/2015 | Park et al. |
| 2015/0348001 A1 | 12/2015 | Van Os et al. |
| 2015/0348002 A1 | 12/2015 | Van Os et al. |
| 2015/0348009 A1 | 12/2015 | Brown et al. |
| 2015/0348014 A1 | 12/2015 | Van Os et al. |
| 2015/0348029 A1 | 12/2015 | Van Os et al. |
| 2015/0350448 A1 | 12/2015 | Coffman et al. |
| 2016/0043905 A1 | 2/2016 | Fiedler |
| 2016/0048705 A1 | 2/2016 | Yang et al. |
| 2016/0061613 A1 | 3/2016 | Jung et al. |
| 2016/0061623 A1 | 3/2016 | Pahwa et al. |
| 2016/0062572 A1 | 3/2016 | Yang et al. |
| 2016/0134737 A1 | 5/2016 | Pulletikurty |
| 2016/0238402 A1 | 8/2016 | McGavran et al. |
| 2016/0253665 A1 | 9/2016 | Van Os et al. |
| 2016/0259489 A1 | 9/2016 | Yang |
| 2016/0358133 A1 | 12/2016 | Van Os et al. |
| 2016/0358134 A1 | 12/2016 | Van Os et al. |
| 2016/0358180 A1 | 12/2016 | Van Os et al. |
| 2017/0011210 A1 | 1/2017 | Cheong et al. |
| 2017/0032375 A1 | 2/2017 | Van Os et al. |
| 2017/0083188 A1 | 3/2017 | Yang et al. |
| 2017/0160098 A1 | 6/2017 | McGavran et al. |

FOREIGN PATENT DOCUMENTS

| | | |
|---|---|---|
| CN | 103970208 A | 8/2014 |
| CN | 104024987 A | 9/2014 |
| CN | 104205785 A | 12/2014 |
| CN | 104272854 A | 1/2015 |
| CN | 104281430 A | 1/2015 |
| CN | 104346297 A | 2/2015 |

(56) References Cited

FOREIGN PATENT DOCUMENTS

| | | |
|---|---|---|
| EP | 0836074 A2 | 4/1998 |
| EP | 1614992 A1 | 1/2006 |
| EP | 1858238 A2 | 11/2007 |
| EP | 2096413 A1 | 9/2009 |
| EP | 2247087 A1 | 11/2010 |
| EP | 2306692 A1 | 4/2011 |
| EP | 2341315 A1 | 7/2011 |
| EP | 2428947 A2 | 3/2012 |
| EP | 2466260 A1 | 6/2012 |
| EP | 2523439 A1 | 11/2012 |
| EP | 2632131 A1 | 8/2013 |
| EP | 2672377 A2 | 12/2013 |
| EP | 2720442 A1 | 4/2014 |
| EP | 2725537 A1 | 4/2014 |
| GB | 2505476 A | 3/2014 |
| JP | 6-284182 A | 10/1994 |
| JP | 11-73530 A | 3/1999 |
| JP | 11-183183 A | 7/1999 |
| JP | 2002-99854 A | 4/2002 |
| JP | 2003-16398 A | 1/2003 |
| JP | 2003-346059 A | 12/2003 |
| JP | 2004-104813 A | 4/2004 |
| JP | 2004-252736 A | 9/2004 |
| JP | 2005-521961 A | 7/2005 |
| JP | 2005-523505 A | 8/2005 |
| JP | 2006-114018 A | 4/2006 |
| JP | 2006-163960 A | 6/2006 |
| JP | 2006-197071 A | 7/2006 |
| JP | 2006-277670 A | 10/2006 |
| JP | 2007-34637 A | 2/2007 |
| JP | 2007-334637 A | 12/2007 |
| JP | 2009-49878 A | 3/2009 |
| JP | 2009-99076 A | 5/2009 |
| JP | 2010-503082 A | 1/2010 |
| JP | 2011-519439 A | 7/2011 |
| JP | 2011-237857 A | 11/2011 |
| JP | 2012-508930 A | 4/2012 |
| JP | 2013-20496 A | 1/2013 |
| JP | 2013-34322 A | 2/2013 |
| JP | 2014-044719 A | 3/2014 |
| JP | 2014-44724 A | 3/2014 |
| JP | 2014-53692 A | 3/2014 |
| JP | 2014-123169 A | 7/2014 |
| KR | 10-2004-0049502 A | 6/2004 |
| KR | 10-2008-0064395 A | 7/2008 |
| KR | 10-2011-0056561 A | 5/2011 |
| KR | 10-2012-0040693 A | 4/2012 |
| KR | 10-2013-0027326 A | 3/2013 |
| KR | 10-2013-0116905 A | 10/2013 |
| KR | 10-2014-0018019 A | 2/2014 |
| KR | 10-2014-0026263 A | 3/2014 |
| KR | 10-2014-0055429 A | 5/2014 |
| TW | 201012152 A | 3/2010 |
| TW | 201137722 A | 11/2011 |
| TW | 201215086 A | 4/2012 |
| TW | 201316247 A | 4/2013 |
| TW | 201324310 A | 6/2013 |
| TW | 201409345 A | 3/2014 |
| TW | M474482 U | 3/2014 |
| TW | 201509168 A | 3/2015 |
| WO | 2003/083793 A2 | 10/2003 |
| WO | 03093765 A2 | 11/2003 |
| WO | 2007/000012 A1 | 1/2007 |
| WO | 2007/008321 A2 | 1/2007 |
| WO | 2007/105937 A1 | 9/2007 |
| WO | 2007/116521 A1 | 10/2007 |
| WO | 2010/039337 A2 | 4/2010 |
| WO | 2010/056484 A2 | 5/2010 |
| WO | 2011063516 A1 | 6/2011 |
| WO | 2012/083113 A2 | 6/2012 |
| WO | 2012/172970 A1 | 12/2012 |
| WO | 2013/023224 A2 | 2/2013 |
| WO | 2013/169875 A2 | 11/2013 |
| WO | 2013/177548 A1 | 11/2013 |
| WO | 2014/074407 A1 | 5/2014 |
| WO | 2014078965 A1 | 5/2014 |
| WO | 2014/115605 A1 | 7/2014 |
| WO | 2014/171734 A2 | 10/2014 |

OTHER PUBLICATIONS

Office Action received for Australian Patent Application No. 2017201064, dated Mar. 9, 2017, 2 pages.
Office Action received for Australian Patent Application No. 2017201068, dated Mar. 10, 2017, 2 pages.
Office Action received for Danish Patent Application No. PA201670074, dated Mar. 16, 2017, 2 pages.
Office Action received for Taiwanese Patent Application No. 104114953, dated Feb. 18, 2017, 9 pages (4 pages of English Translation and 5 pages of Official copy).
Cazlar, "[iOS] MapsGPS (formerly PebbGPS) is now available—now with colour turn-by-turn directions!", Online Available at <https://forums.pebble.com/t/ios-mapsgps-formerly-pebbgps-is-now-available-now-with-colour-turn-by-turn-directions/5584>, 2013, 31 pages.
International Preliminary Report on Patentability received for PCT Patent Application No. PCT/US2015/055165, dated Sep. 21, 2017, 15 pages.
International Preliminary Report on Patentability received for PCT Patent Application No. PCT/US2016/016621, dated Aug. 24, 2017, 8 pages.
Non-Final Office Action received for U.S. Appl. No. 14/503,296, dated Aug. 28, 2017, 14 pages.
Non-Final Office Action received for U.S. Appl. No. 14/836,754, dated Aug. 16, 2017, 25 pages.
Office Action received for Australian Patent Application No. 2015302298, dated Sep. 14, 2017, 3 pages.
Office Action received for Australian Patent Application No. 2015385757, dated Sep. 11, 2017, 3 pages.
Office Action received for Danish Patent Application No. PA201670749, dated Oct. 3, 2017, 3 pages.
Office Action received for Taiwanese Patent Application No. 104117508, dated Jul. 14, 2017, 9 pages (4 pages of English Translation and 5 pages of Official Copy).
Office Action received for Taiwanese Patent Application No. 104128689, dated Aug. 21, 2017, 8 pages (3 pages of English translation and 5 pages of official Copy).
Ehowtech, "How to Get Written Directions on a Garmin : Using a Garmin", available online at: https://www.youtube.com/watch?v=s_EKT6qH4LI, Dec. 2, 2012, 1 page.
Non-Final Office Action received for U.S. Appl. No. 14/836,754, dated Oct. 21, 2016, 18 pages.
Office Action received for Australian Patent Application No. 2016100367, dated Oct. 26, 2016, 3 pages.
Office Action received for Chinese Patent Application No. 201620480708.6, dated Sep. 14, 2016, 3 pages (1 page of English Translation and 2 pages of Official Copy).
Corrected Notice of Allowance received for U.S. Appl. No. 15/137,944, dated Jan. 11, 2018, 2 pages.
Final Office Action received for U.S. Appl. No. 14/839,897, dated Jan. 10, 2018, 16 pages.
Office Action received for Japanese Patent Application No. 2016-224507, dated Dec. 1, 2017, 14 pages (7 pages of English Translation and 7 pages of Official Copy).
"Real Solution of two-step-authentication Password Management for Authentication Enhancement", Fukuda Takao, Nikkei PC, JPN, Nikkei Business Publications, Inc., No. 694, Mar. 24, 2014, 8 pages (Official Copy only) (see attached 37 CFR § 1.98(a) (3)).
Final Office Action received for U.S. Appl. No. 14/836,754, dated Jun. 14, 2017, 23 pages.
Non Final Office Action received for U.S. Appl. No. 14/869,877, dated Jun. 16, 2017, 17 pages.
Notice of Allowance received for Taiwanese Patent Application No. 104133757, dated Jan. 18, 2017, 3 pages (Official Copy only).{See Communication Under 37 CFR § 1.98(a) (3)}.

(56) References Cited

OTHER PUBLICATIONS

Office Action received for Taiwanese Patent Application No. 104133756, dated May 17, 2017, 13 pages (6 pages of English Translation and 7 pages of Official Copy).
Oates, Nathan, "PebbGPS", Available online at:- https://pebble.devpost.com/submissions/21694-pebbgps, Mar. 16, 2014, 2 pages.
The Gadget Pill, "Sygic for Android Navigation with HUD", Available online at:-https://www.youtube.com/watch?v=fGqrycRevGU, Mar. 23, 2014, 1 page.
Notice of Allowance received for Japanese Patent Application No. 2016-224508, dated Jun. 20, 2017, 3 pages (Official Copy only), {See Communication under 37 CFR§ 1.98(a) (3)}.
Office Action received for Korean Patent Application No. 10-2017-0022365, dated Jun. 26, 2017, 10 pages (4 pages of English Translation and 6 pages of Official Copy).
Office Action received for Korean Patent Application No. 10-2017-0022546, dated Jun. 21, 2017, 12 pages (5 pages of English Translation and 7 pages of Official copy).
Naver Blog, "How to Use Smart Wallet and Registered Card", Online Available at <http://feena74.blog.me/140185758401>, Mar. 29, 2013, 11 pages (Official Copy Only). {See Communication under 37 CFR § 1.98(a) (3)}.
Office Action received for Japanese Patent Application No. 2016-224507, dated Jun. 16, 2017, 16 pages (8 pages of English Translation and 8 pages of Official Copy).
Non Final Office Action received for U.S. Appl. No. 14/839,913, dated Mar. 2, 2016, 11 pages.
Final Office Action received for U.S. Appl. No. 14/836,754, dated Mar. 22, 2016, 17 pages.
Notice of Allowance received for Chinese Patent Application No. 201520358683.8, dated Mar. 10, 2016, 5 pages (3 pages of English Translation and 2 pages of Official Copy).
Office Action received for German Patent Application No. 2020150042678, dated Nov. 4, 2015, 5 pages (3 pages of English Translation and 2 pages of Official Copy).
Easyvideoguides, "Mapquest", available on : https://www.youtube.com/watch?v=7sDIDNM2bCI, Dec. 26, 2007, 4 pages.
Office Action received for Danish Patent Application No. PA201570664, dated Mar. 15, 2016, 10 pages.
Office Action received for Danish Patent Application No. PA201570665, dated Mar. 31, 2016, 9 pages.
International Search Report and Written Opinion received for PCT Application No. PCT/US2015/047507, dated Feb. 22, 2016, 22 pages.
International Search Report and Written Opinion received for PCT Patent Application No. PCT/US2015/055165, dated Apr. 20, 2016, 22 pages.
Office Action received for Australian Patent Application No. 2016100155, dated May 4, 2016, 7 pages.
Office Action received for Danish Patent Application No. PA201670074, dated Apr. 7, 2016, 8 pages.
Notice of Allowance received for U.S. Appl. No. 14/503,327, dated Nov. 30, 2017, 5 pages.
Office Action received for Danish Patent Application No. PA201670751, dated Nov. 13, 2017, 2 pages.
Final Office Action received for U.S. Appl. No. 14/503,072, dated Mar. 2, 2017, 9 pages.
Final Office Action received for U.S. Appl. No. 14/719217, dated Feb. 23, 2017, 37 pages.
Intention to Grant received for Danish Patent Application No. PA201570665, dated Feb. 28, 2017, 2 pages.
International Preliminary Report on Patentability received for PCT Patent Application No. PCT/US2015/025188, dated Mar. 2, 2017, 8 pages.
International Preliminary Report on Patentability received for PCT Patent Application No. PCT/US2015/046892, dated Mar. 16, 2017, 14 pages.
International Preliminary Report on Patentability received for PCT Patent Application No. PCT/US2015/047537, dated Mar. 16, 2017, 16 pages.
Notice of Allowance received for Danish Patent Application No. PA201570664, dated Feb. 20, 2017, 2 pages.
Office Action received for Danish Patent Application No. PA201570773, dated Feb. 15, 2017, 3 pages.
International Search Report and Written Opinion received for PCT Patent Application No. PCT/US2016/016621, dated May 9, 2016, 12 pages.
Non-Final Office Action received for U.S. Appl. No. 14/719,217, dated Jul. 28, 2016, 28 pages.
Non-Final Office Action received for U.S. Appl. No. 14/839,913, dated Jul. 28, 2016, 12 pages.
Non-final Office Action received for U.S. Appl. No. 14/864,011, dated Jun. 10, 2016, 10 pages.
Notice of Allowance received for U.S. Appl. No. 14/839,913, dated Aug. 11, 2016, 5 pages.
Notice of Allowance received for U.S. Appl. No. 14/864,011, dated Apr. 28, 2016, 5 pages.
Office Action received for Chinese Patent Application No. 201620119869.2, dated Jun. 3, 2016, 2 pages (1 page of English Translation and 1 page of Official copy).
Office Action received for Taiwanese Patent Application No. 104117508, dated Jul. 20, 2016, 19 pages (8 pages of English Translation and 11 page of Official copy).
Non-Final Office Action received for U.S. Appl. No. 15/137,944, dated Jul. 27, 2017, 13 pages.
International Preliminary Report on Patentability received for PCT Patent Application No. PCT/US2016/034175, dated Dec. 14, 2017, 14 pages.
Notice of Allowance received for Taiwanese Patent Application No. 104133756, dated Nov. 30, 2017, 5 pages (2 pages of English Translation and 3 pages of Official Copy).
Notice of Allowance received for U.S. Appl. No. 15/137,944, dated Dec. 21, 2017, 8 pages.
Office Action received for Australian Patent Application No. 2017101375, dated Dec. 1, 2017, 3 pages.
Office Action received for Japanese Patent Application No. 2016-558332, dated Dec. 8, 2017, 12 pages (6 pages of English Translation and 6 pages of Official Copy).
International Preliminary Report on Patentability received for PCT Patent Application No. PCT/US2015/030199, dated Dec. 15, 2016, 7 pages.
International Preliminary Report on Patentability received for PCT Patent Application No. PCT/US2015/033326, dated Dec. 8, 2016, 11 pages.
International Preliminary Report on Patentability received for PCT Patent Application No. PCT/US2015/033380, dated Dec. 8, 2016, 10 pages.
Office Action received for Australian Patent Application No. 2016100383, dated Nov. 11, 2016, 3 pages.
Office Action received for Chinese Patent Application No. 201620509515.9, dated Nov. 9, 2016, 2 pages (1 page of English Translation and 1 page of Official Copy).
Office Action received for Danish Patent Application No. PA201670362, dated Nov. 21, 2016, 11 pages.
Office Action received for Taiwanese Patent Application No. 104128689, dated Nov. 14, 2016, 12 pages (5 pages of English Translation and 7 pages of Official Copy).
Office Action received for Danish Patent Application No. PA201570664, dated Dec. 14, 2016, 2 pages.
Non Final Office Action received for U.S. Appl. No. 14/503,364, dated Feb. 3, 2016, 16 pages.
Non Final Office Action received for U.S. Appl. No. 14/864,011, dated Jan. 21, 2016, 10 pages.
Non Final Office Action received for U.S. Appl. No. 14/869,877, dated Jan. 29, 2016, 18 pages.
International Search Report and Written Opinion received for PCT Application No. PCT/US2015/046892, dated Jan. 27, 2016, 20 pages.
Invitation to Pay Additional Fees received for PCT Patent Application No. PCT/US2015/047507, dated Jan. 4, 2016, 8 pages.
Invitation to Pay Additional Fees received for PCT Patent Application No. PCT/US2015/055165, dated Jan. 18, 2016, 6 pages.

(56) References Cited

OTHER PUBLICATIONS

Advisory Action received for U.S. Appl. No. 15/137,944, dated May 11, 2017, 6 pages.
Decision to Grant received for Danish Patent Application No. P4201570665, dated Apr. 26, 2017, 2 pages.
Final Office Action received for U.S. Appl. No. 14/503,327, dated May 18, 2017, 10 pages.
Non-Final Office Action received for U.S. Appl. No. 14/839,897, dated May 18, 2017, 11 pages.
Notice of Allowance received for Chinese Patent Application No. 201620480708.6, dated Apr. 20, 2017, 3 pages (2 pages of English Translation and 1 page of Official Copy).
Notice of Allowance received for Chinese Patent Application No. 201620480846.4, dated Apr. 20, 2017, 3 pages (2 pages of English Translation and 1 page of Official Copy).
Notice of Allowance received for Taiwanese Patent Application No. 104128700, dated Mar. 27, 2017, 3 pages (Official Copy only). {See Communication under 37 CFR § 1.98(a) (3)}.
Office Action received for Danish Patent Application No. PA201670362, dated Jun. 1, 2017, 6 pages.
Final Office Action received for U.S. Appl. No. 15/137,944, dated Feb. 27, 2017, 11 pages.
Final Office Action received for U.S. Appl. No. 14/836,754, dated Mar. 31, 2017, 24 pages.
HARIS, "Google Maps Navigation on Android 2.0", Sizzled Core, Online available at <http://www.sizzledcore.com/2009/10/29/google-maps-navigation-on-android-20/>, Oct. 29, 2009, 6 pages.
Final Office Action received for U.S. Appl. No. 14/503,072, dated Sep. 1, 2015, 16 pages.
Non Final Office Action received for U.S. Appl. No. 14/503,072, dated Jan. 26, 2015, 12 pages.
Final Office Action received for U.S. Appl. No. 14/503,296, dated Jul. 2, 2015, 7 pages.
Non Final Office Action received for U.S. Appl. No. 14/503,296, dated Jan. 30, 2015, 16 pages.
Non-Final Office Action received for U.S. Appl. No. 14/503,381, dated May 13, 2015, 13 pages.
Notice of Allowance received for the U.S. Appl. No. 14/503,381, dated Dec. 16, 2015, 8 pages.
Non Final Office Action received for U.S. Appl. No. 14/836,754, dated Nov. 17, 2015, 15 pages.
Office Action received for Australian Patent Application No. 2015100708, dated Sep. 8, 2015, 4 pages.
Office Action received for Australian Patent Application No. 2015100709, dated Sep. 9, 2015 (Examination Report 1), 4 pages.
Office Action received for Australian Patent Application No. 2015100709, dated Sep. 9, 2015 (Examination Report 2), 4 pages.
Notice of Allowance received for Chinese Patent Application No. 201520357381.9, dated Jul. 29, 2015, 4 pages (2 pages of English Translation and 2 pages of Official Copy).
Office Action received for Chinese Patent Application No. 201520358683.8, dated Sep. 2, 2015, 4 pages (2 pages of English Translation and 2 pages of Official Copy).
Kamijo, Noboru, "Next Generation Mobile System—WatchPad1. 5", Available at <http://researcher.ibm.com/researcher/view_group_subpage.php?id=5617>, accessed on Jul. 4, 2015, 2 pages.
NPASQUA, "Maps: ability to swipe step by step in turn-by-turn mode", 2012, Apple Support Communities, Available at: <https://discussions.apple.com/thread/4424256?start=O&tstart=0>.
International Search Report and Written Opinion received for PCT Application No. PCT/US2015/033326, dated Aug. 10, 2015, 13 pages.
International Search Report and Written Opinion received for PCT Patent Application No. PCT/US2015/033380, dated Aug. 10, 2015, 13 pages.
Invitation to Pay Additional Fees and Partial Search Report received for PCT Patent Application No. PCT/US2015/046892, dated Nov. 4, 2015, 5 pages.

International Search Report and Written Opinion received for PCT Patent Application No. PCT/US2015/030199, dated Aug. 14, 2015, 11 pages.
International Search Report and Written Opinion received for PCT Patent Application No. PCT/US2015/025188, dated Jun. 23, 2015, 11 pages.
Advisory Action received for U.S. Appl. No. 14/869,877, dated Jan. 5, 2017, 3 pages.
Extended European Search Report received for European Patent Application No. 16201195.1, dated Feb. 7, 2017, 13 pages.
Extended European Search Report received for European Patent Application No. 16201205.8, dated Jan. 5, 2017, 12 pages.
Final Office Action received for U.S. Appl. No. 14/870,793, dated Jan. 19, 2017, 16 pages.
"IOS Security", White Paper, Available online at <https://web.archive.org/web/20150526223200/http://www.apple.com/business/docs/iOS_Security_Guide.pdf>, Apr. 2015, 55 pages.
Office Action received for Australian Patent Application No. 2016100796, dated Feb. 13, 2017, 4 pages.
Office Action received for Chinese Patent Application No. 201620119869.2, dated Nov. 22, 2016, 2 pages (Official Copy only). {See Communication Under 37 CFR § 1.98(a) (3)}.
Office Action received for Chinese Patent Application No. 201620480846.4, dated Jan. 9, 2017, 3 pages (1 page of English Translation and 2 pages of Official Copy).
Office Action received for Chinese Patent Application No. 201620480708.6, dated Jan. 9, 2017, 3 pages (1 page of English Translation and 2 pages of Official Copy).
Office Action received for Danish Patent Application No. PA201670749, dated Jan. 30, 2017, 11 pages.
Office Action received for Danish Patent Application No. PA201670751, dated Jan. 13, 2017, 9 pages.
Advisory Action received for U.S. Appl. No. 14/503,296, dated Oct. 2, 2015, 3 pages.
Non-Final Office Action received for U.S. Appl. No. 14/503,072, dated Jun. 17, 2016, 19 pages.
Notice of Allowance received for U.S. Appl. No. 14/503,364, dated Jun. 16, 2016, 11 pages.
Office Action received for Australian Patent Application No. 2016100367, dated May 25, 2016, 3 pages.
Office Action received for Australian Patent Application No. 2016100383, dated Jun. 9, 2016, 2 pages.
Office Action received for Danish Patent Application No. PA201570664, dated Jun. 3, 2016, 3 pages.
Office Action received for Taiwanese Patent Application No. 104114953, dated Jun. 8, 2016, 11 pages (5 pages of English Translation and 6 pages of Official Copy).
Walker, Alissa, "Apple Watch's Walking Directions Buzz Your Wrist When It's Time to Turn", available online at: http://gizmodo.com/apple-watch-will-give-you-a-buzz-when-its-time-to-turn-1632557384, Sep. 9, 2014, 2 pages.
Office Action received for Danish Patent Application No. PA201670074, dated Jun. 28, 2016, 5 pages.
Advisory Action received for U.S. Appl. No. 14/870,793, dated Apr. 13, 2017, 3 pages.
Extended European Search Report received for European Patent Application No. 16201159.7, dated Mar. 27, 2017, 12 pages.
Final Office Action received for U.S. Appl. No. 14/870,726, dated Apr. 19, 2017, 17 pages.
Office Action received for Australian Patent Application No. 2017100231, dated Apr. 13, 2017, 3 pages.
Office Action received for Australian Patent Application No. 2015266650, dated Apr. 10, 2017, 4 pages.
Office Action received for Australian Patent Application No. 2015266693, dated Apr. 10, 2017, 4 pages.
Office Action received for Taiwanese Patent Application No. 104117508, dated Mar. 20, 2017, 22 pages (9 pages of English Translation and 13 pages of Official Copy).
Non-Final Office Action received for U.S. Appl. No. 15/433,238, dated Nov. 3, 2017, 6 pages.
Notice of Allowance received for Taiwanese Patent Application No. 104114953, dated Oct. 17, 2017, 3 pages (Official Copy) (see attached 37 CFR § 1.98(a) (3)).

(56) References Cited

OTHER PUBLICATIONS

Final Office Action received for U.S. Appl. No. 14/869,877, dated Aug. 3, 2016, 13 pages.
International Search Report and Written Opinion received for PCT Patent Application No. PCT/US16/34175, dated Oct. 7, 2016, 17 pages.
Invitation to Pay Additional Fees received for PCT Patent Application No. PCT/US16/34175, dated Aug. 11, 2016, 3 pages.
Non Final Office Action received for U.S. Appl. No. 14/870,793, dated Apr. 19, 2016, 17 pages.
Non-Final Office Action received for U.S. Appl. No. 14/503,296, dated Oct. 5, 2016, 11 pages.
Non Final Office Action received for U.S. Appl. No. 14/503,327, dated Sep. 12, 2016, 10 pages.
Non-Final Office Action received for U.S. Appl. No. 14/870,726, dated Sep. 16, 2016, 12 pages.
Non-Final Office Action received for U.S. Appl. No. 15/137,944, dated Oct. 18, 2016, 10 pages.
Notice of Allowance received for Danish Patent Application No. PA201570771, dated Sep. 2, 2016, 2 pages.
Notice of Allowance received for U.S. Appl. No. 14/864,011, dated Oct. 5, 2016, 5 pages.
Office Action received for Australian Patent Application No. 2016100796, dated Aug. 26, 2016, 6 pages.
Office Action received for Chinese Patent Application No. 201620480846.4, dated Sep. 14, 2016, 3 pages (1 page of English Translation and 2 pages of Official Copy).
Office Action received for Danish Patent Application No. PA201570665, dated Sep. 5, 2016, 3 pages.
Office Action received for Danish Patent Application No. PA201570771, dated Jun. 13, 2016, 3 pages.
Office Action received for Danish Patent Application No. PA201570771, dated Mar. 17, 2016, 8 pages.
Office Action Received for Danish Patent Application No. PA201570773, dated Mar. 18, 2016, 9 pages.
Office Action received for Danish Patent Application No. PA201570773, dated Sep. 12, 2016, 3 pages.
Office Action received for Taiwanese Patent Application No. 104128700, dated Aug. 31, 2016, 13 pages (6 pages of English Translation and 7 pages of Official Copy).
Office Action received for Taiwanese Patent Application No. 104133757, dated Jul. 6, 2016, 22 pages (9 pages of English Translation and 13 pages of Official Copy).
Notice of Allowance received for Danish Patent Application No. PA201570773 , dated Apr. 26, 2018, 2 pages.
Office Action received for Danish Patent Application No. PA201570773, dated Aug. 28, 2017, 3 pages.
Office Action received for Chinese Patent Application No. 201510284896.5, dated Jun. 28, 2018, 15 pages (4 pages of English Translation and 11 pages of Official Copy).
Extended European Search Report received for European Patent Application No. 16804040.0, dated Feb. 26, 2018, 9 pages.
Intention to Grant received for European Patent Application No. 15724160.5, dated Mar. 7, 2018, 8 pages.
Notice of Acceptance received for Australian Patent Application No. 2017201064, dated Feb. 20, 2018, 3 pages.
Office Action received for Australian Patent Application No. 2017101375, dated Feb. 19, 2018, 4 pages.
Office Action Received for European Patent Application No. 16201195.1, dated Feb. 14, 2018, 12 pages.
Notice of Allowance received for Korean Patent Application No. 10-2017-0022365, dated Mar. 27, 2018, 4 pages (1 page of English Translation and 3 pages of Official copy).
Office Action received for Australian Patent Application No. 2015302298, dated Apr. 4, 2018, 3 pages.
Intention to Grant received for Danish Patent Application No. PA201570773, dated Mar. 9, 2018, 2 pages.
Notice of Allowance received for Korean Patent Application No. 10-2017-0022546, dated Feb. 27, 2018, 4 pages (1 page of English Translation and 3 pages of Official Copy).

Office Action received for Japanese Patent Application No. 2016-569665, dated Jan. 19, 2018, 10 pages (5 pages of English Translation and 5 pages of Official Copy).
Office Action received for Japanese Patent Application No. 2017-545733, dated Feb. 13, 2018, 7 pages (3 pages of English Translation and 4 pages of 1 Official Copy).
Corrected Notice of Allowance received for U.S. Appl. No. 15/137,944, dated Jan. 19, 2018, 2 pages.
Non-Final Office Action received for U.S. Appl. No. 15/294,439, dated Jan. 26, 2018, 18 pages.
Notice of Acceptance received for Australian Patent Application No. 2015266650, dated Jan. 18, 2018, 3 pages.
Notice of Acceptance received for Australian Patent Application No. 2015266693, dated Jan. 19, 2018, 3 pages.
Office Action received for Australian Patent Application No. 2017201068, dated Jan. 17, 2018, 5 pages.
Office Action received for Danish Patent Application No. PA201670362, dated Jan. 29, 2018, 3 pages.
Office Action received for European Patent Application No. 15727291.5, dated Jan. 15, 2018, 8 pages.
Office Action received for European Patent Application No. 15728352.4, dated Jan. 25, 2018, 10 pages.
Decision to Grant received for European Patent Application No. 15724160.5, dated Jun. 14, 2018, 2 pages.
Notice of Allowance received for Japanese Patent Application No. 2017-545733, dated Jun. 1, 2018, 4 pages (1 page of English Translation and 3 pages of 1 Official copy).
Notice of Allowance received for U.S. Appl. No. 14/839,897, dated Jun. 8, 2018, 11 pages.
Office Action received for Chinese Patent Application No. 201610084974.1, dated May 3, 2018, 12 pages (5 pages of English Translation and 7 pages of Official Copy).
Office Action received for Japanese Patent Application No. 2017-507413, dated May 25, 2018, 14 pages (7 pages of English Translation and 7 pages of 1 Official Copy).
Supplemental Notice of Allowance received for U.S. Appl. No. 15/433,238, dated Jun. 20, 2018, 2 pages.
Notice of Allowance received for U.S. Appl. No. 14/503,327, dated Mar. 22, 2018, 5 pages.
Notice of Allowance received for U.S. Appl. No. 14/503,072, dated Mar. 26, 2018, 6 pages.
Notice of Acceptance received for Australian Patent Application No. 2015385757, dated Jul. 16, 2018, 3 pages.
Non-Final Office Action received for U.S. Appl. No. 14/719,217, dated Jul. 26, 2018, 40 pages.
Office Action received for Australian Patent Application No. 2015302298, dated Jul. 20, 2018, 3 pages.
Corrected Notice of Allowance received for U.S. Appl. No. 14/836,754, dated May 23, 2018, 2 pages.
Final Office Action received for U.S. Appl. No. 14/503,296, dated Jun. 4, 2018, 8 pages.
Notice of Allowance received for U.S. Appl. No. 14/503,072, dated Jun. 4, 2018, 6 pages.
Office Action received for Korean Patent Application No. 10-2016-0152210, dated May 14, 2018, 13 pages (6 pages of English Translation and 7 pages of Official Copy).
Examiner's Answer to Appeal Brief received for U.S. Appl. No. 14/870,793, dated Apr. 16, 2018, 15 pages.
Final Office Action received for U.S. Appl. No. 14/869,877, dated Apr. 26, 2018, 18 pages.
Cipriani, Jason, "How to arrange iPhone and iPad apps using iTunes", Available online at:- https://www.cnet.com/how-to/how-to-arrange-iphone-and-ipad-apps-using-itunes/, May 23, 2011, 4 pages.
Notice of Allowance received for U.S. Appl. No. 14/836,754, dated May 10, 2018, 27 pages.
Notice of Allowance received for U.S. Appl. No. 15/433,238, dated May 17, 2018, 7 pages.
Office Action received for European Patent Application No. 15787091.6, dated Oct. 8, 2018, 7 pages.
Office Action received for Japanese Patent Application No. 2018-126311, dated Nov. 2, 2018, 4 pages (2 pages of English Translation and 2 pages of official copy).

(56) References Cited

OTHER PUBLICATIONS

Nozawa et al., "iPad Perfect Manual for iOS 4", Jpn, Sotec Ltd., Yanagisawa Junichi, Dec. 31, 2010, pp. 189-190 (Official Copy Only) (See Communication under 37 CFR § 1.98(a) (3)).
Office Action received for European Patent Application No. 16201205.8, dated Feb. 16, 2018, 12 pages.

\* cited by examiner

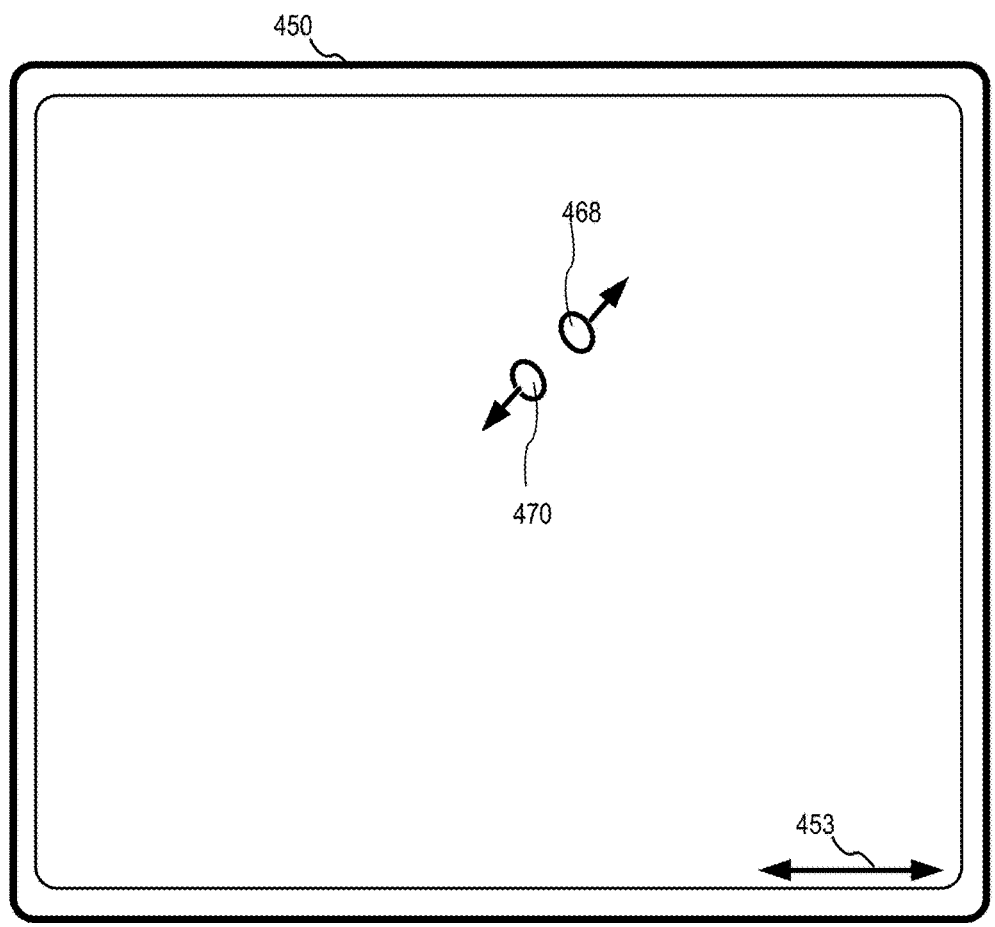
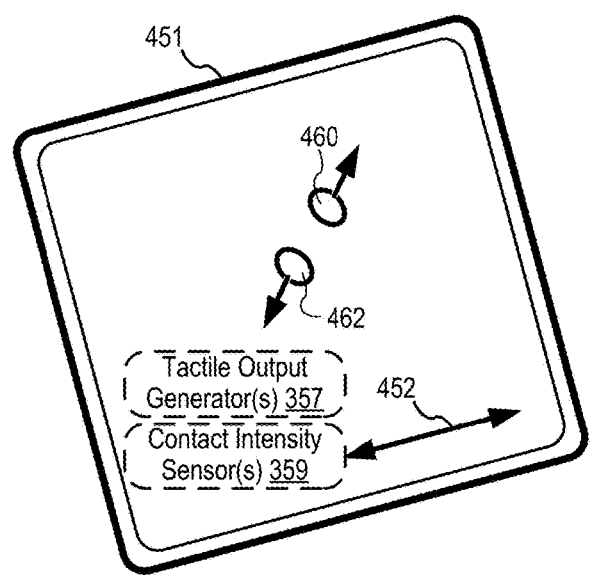
*FIG. 4B*

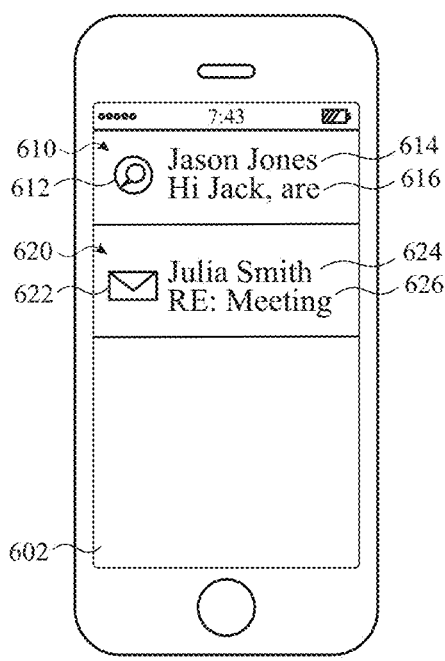
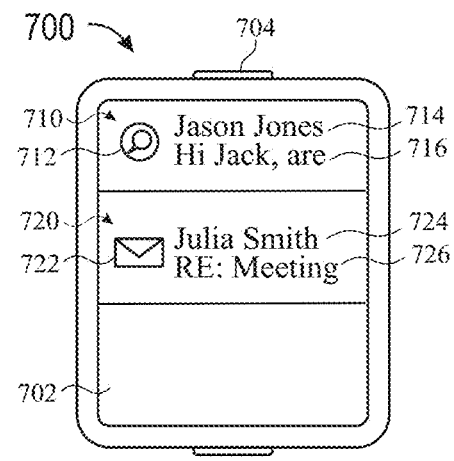
FIG. 7A
FIG. 7B

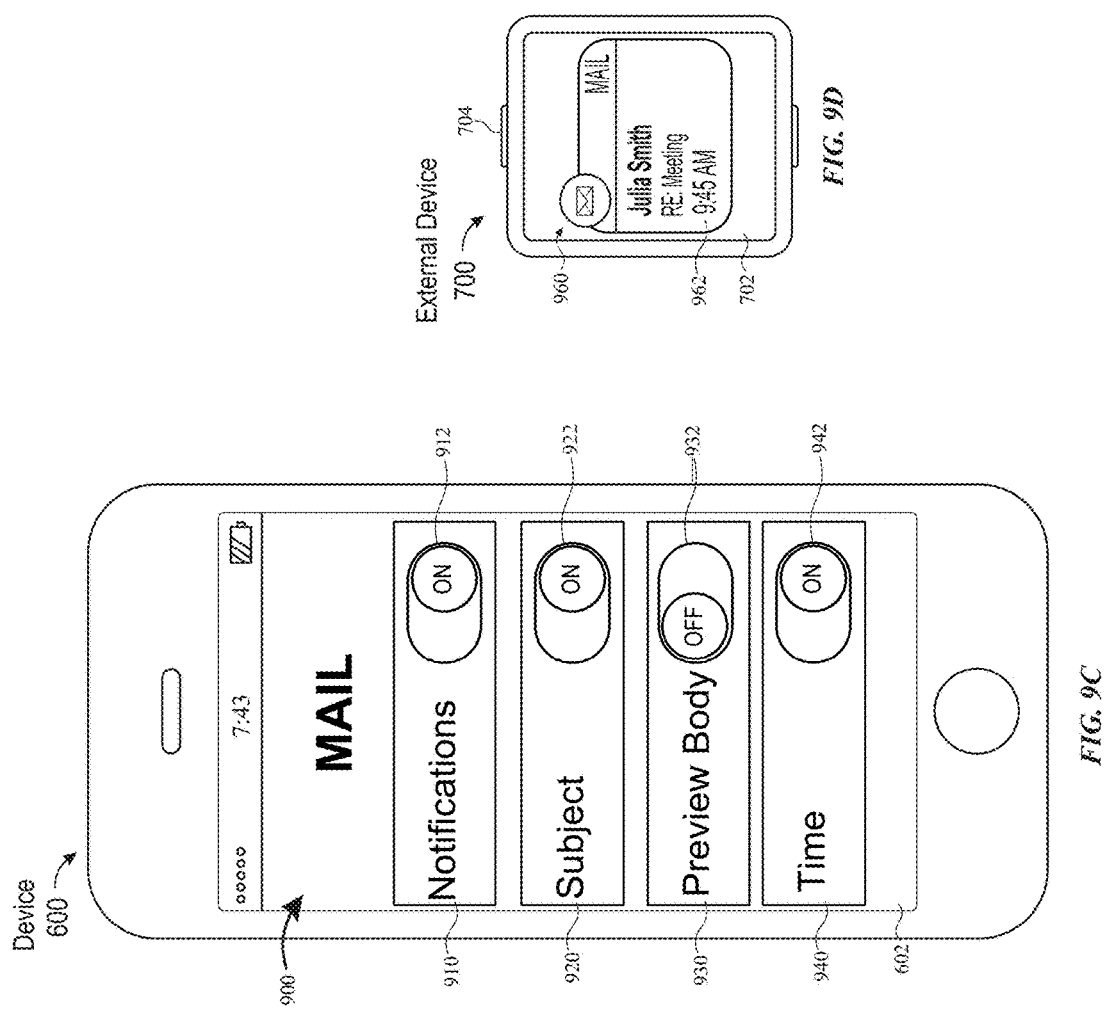

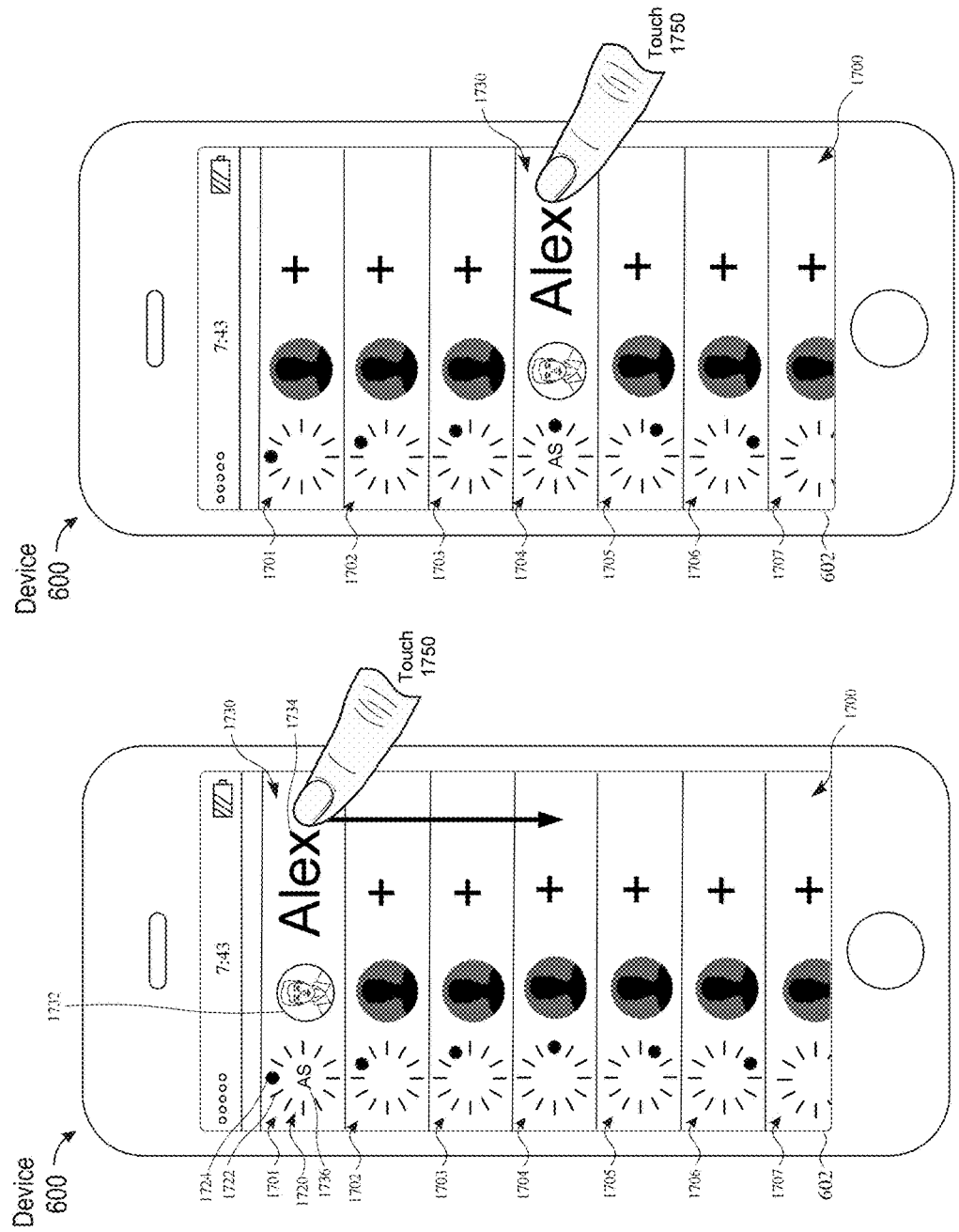

1800 ⇘

1802
Display a user interface on a first touch-sensitive display of a first electronic device.

| The user interface includes one or more representations of one or more locations on a second display of a second electronic device. |

| The second electronic device is remote from the first electronic device and is in a paired relationship with the first electronic device. |

1804
Detect a user input on the first touch-sensitive display at a representation of a first location of the one or more locations on the second display.

| The representation of the first location includes an affordance. |

1806
While continuing to detect the user input on the first touch-sensitive display, detect movement of the user input from the representation of the first location of the one or more locations on the second display to a representation of a second location of the one or more locations on the second display.

1808
In response to detecting the movement of the user input from the representation of the first location to the representation of the second location, associate the affordance with the second location on the second display.

*FIG. 18*

DEVICE CONFIGURATION USER INTERFACE

CROSS-REFERENCE TO RELATED APPLICATIONS

This application claims priority to U.S. Provisional Patent Application No. 62/129,947, filed Mar. 8, 2015, the content of which is hereby incorporated by reference in its entirety.

This application also relates to the following U.S. provisional applications: U.S. Provisional Patent Application Ser. No. 62/129,955, titled "Electronic Touch Communication," filed Mar. 8, 2015, U.S. Provisional Patent Application Ser. No. 62/044,961, titled "Electronic Touch Communication," filed Mar. 8, 2015, U.S. Provisional Patent Application Ser. No. 62/044,894, titled "Reduced-Size Interfaces for Managing Alerts," filed Sep. 2, 2014, U.S. Provisional Patent Application Ser. No. 62/129,818, titled "Reduced-Size Interfaces for Managing Alerts," filed Mar. 7, 2015, U.S. Provisional Patent Application Ser. No. 62/044,953, titled "Reduced-Size Notification Interface," filed Sep. 2, 2014, and U.S. Provisional Patent Application Ser. No. 62/129,924, titled "Reduced-Size Notification Interface," filed Mar. 8, 2015. The contents of these applications are hereby incorporated by reference in their entirety.

FIELD

The present disclosure relates generally to computer user interfaces, and more specifically to techniques for configuring an electronic device.

BACKGROUND

Modern electronic devices often have many customizable features that can be set by a user according to the user's preferences. These features may include the ability to perform various tasks or services which a user may turn on or off based on personal preferences. Thus, there is an opportunity to provide techniques and interfaces for allowing a user to configure an electronic device. Modern electronic devices are also capable of communicating with other electronic devices via, for example, wireless communication. The ability to communicate with other devices may allow devices to share information and interact with each other. Thus, there is also an opportunity to provide techniques for establishing communication between devices and to use the communication to improve a configuration process.

BRIEF SUMMARY

Some techniques for configuring an electronic device, however, are generally cumbersome and inefficient. For example, existing techniques use a complex and time-consuming user interface, which may not be suitable for configuring a device with a reduced display size. Existing techniques require more time than necessary, wasting user time and device energy. This latter consideration is particularly important in battery-operated devices.

Accordingly, there is a need for electronic devices with faster, more efficient methods and interfaces for configuring an electronic device. Such methods and interfaces optionally complement or replace other methods for configuring an electronic device. Such methods and interfaces reduce the cognitive burden on a user and produce a more efficient human-machine interface. For battery-operated computing devices, such methods and interfaces conserve power and increase the time between battery charges.

A first electronic device has a first display and is in a paired relationship with a second electronic device with a second display and remote from the first electronic device. The first electronic device receives a plurality of alerts comprising information. In response to receiving the plurality of alerts, the first electronic device displays local notifications on the first display corresponding to a first set of alerts of the plurality of alerts, and sends data representing at least a portion of the plurality of alerts. The data includes instructions to cause the second electronic device to display remote notifications on the second display corresponding to a second set of alerts of the at least a portion of the plurality of alerts.

An electronic device includes a display, one or more processors, a memory, and one or more programs. The one or more programs are stored in the memory and configured to be executed by the one or more processors. The one or more programs include instructions for receiving a plurality of alerts comprising information, and, in response to receiving the plurality of alerts, displaying local notifications on the display corresponding to a first set of alerts of the plurality of alerts and sending data representing at least a portion of the plurality of alerts. The data includes instructions to cause a second electronic device with a second display to display remote notifications on the second display corresponding to a second set of alerts of the at least a portion of the plurality of alerts. The second electronic device is remote from the electronic device and is in a paired relationship with the electronic device.

A non-transitory computer-readable storage medium stores one or more programs comprising instructions, which when executed by one or more processors of an electronic device with a display, cause the device to receive a plurality of alerts comprising information. The instruction further cause the device to, in response to receiving the plurality of alerts display local notifications on the display corresponding to a first set of alerts of the plurality of alerts and send data representing at least a portion of the plurality of alerts. The data includes instructions to cause a second electronic device with a second display to display remote notifications on the second display corresponding to a second set of alerts of the at least a portion of the plurality of alerts. The second electronic device is remote from the electronic device and is in a paired relationship with the electronic device.

An electronic device includes a display and means for receiving a plurality of alerts comprising information. The device further includes means for, in response to receiving the plurality of alerts, displaying local notifications on the display corresponding to a first set of alerts of the plurality of alerts and sending data representing at least a portion of the plurality of alerts. The data includes instructions to cause a second electronic device with a second display to display remote notifications on the second display corresponding to a second set of alerts of the at least a portion of the plurality of alerts. The second electronic device is remote from the electronic device and is in a paired relationship with the electronic device.

An electronic device includes a display unit configured to display a graphic user interface and a processing unit coupled to the display unit. The processing unit is configured to receive a plurality of alerts comprising information. In response to receiving the plurality of alerts, the processing unit is further configured to enable display of local notifications on the display unit corresponding to a first set of alerts of the plurality of alerts and send data representing at least a portion of the plurality of alerts. The data includes instructions to cause a second electronic device with a second display unit to display remote notifications on the second display unit corresponding to a second set of alerts of the at least a portion of the plurality of alerts. The second electronic device is remote from the electronic device and is in a paired relationship with the electronic device.

A first electronic device has a display and is in a paired relationship with a second electronic device remote from the first electronic device. The first electronic device detects a first user input that sets the first electronic device to operate in a first configuration associated with a plurality of operational parameters, where the operational parameters are associated with functions performed by both the first electronic device and the second electronic device. The first electronic device displays a user interface including an option to set a configuration of the plurality of operational parameters on the second electronic device to the first configuration of the first electronic device and detects a second user input, where the second user input represents a selection of the option. In response to detecting the second user input, the first electronic device sends data that includes instructions to cause the second electronic device to be set to the first configuration.

An electronic device includes a display, one or more processors, a memory, and one or more programs. The one or more programs are stored in the memory and configured to be executed by the one or more processors. The one or more programs include instructions for detecting a first user input that sets the electronic device to operate in a first configuration associated with a plurality of operational parameters, where the operational parameters are associated with functions performed by the electronic device and a second electronic device remote from the electronic device and in a paired relationship with the electronic device. The one or more programs further include instructions for: displaying a user interface including an option to set a configuration of the plurality of operational parameters on the second electronic device to the first configuration of the electronic device; detecting a second user input, where the second user input represents a selection of the option; and, in response to detecting the second user input, sending data that includes instructions to cause the second electronic device to be set to the first configuration.

A non-transitory computer-readable storage medium stores one or more programs. The one or more programs comprise instructions, which when executed by one or more processors of an electronic device with a display, cause the device to detect a first user input that sets the electronic device to operate in a first configuration associated with a plurality of operational parameters. The operational parameters are associated with functions performed by the electronic device and a second electronic device remote from the electronic device and in a paired relationship with the electronic device. The instruction further cause the device to: display a user interface including an option to set a configuration of the plurality of operational parameters on the second electronic device to the first configuration of the electronic device; detect a second user input, wherein the second user input represents a selection of the option; and, in response to detecting the second user input, send data that includes instructions to cause the second electronic device to be set to the first configuration.

An electronic device includes a display and means for detecting a first user input that sets the electronic device to operate in a first configuration associated with a plurality of operational parameters. The operational parameters are associated with functions performed by the electronic device and a second electronic device remote from the electronic device and in a paired relationship with the electronic device. The device further includes: means for displaying a user interface including an option to set a configuration of the plurality of operational parameters on the second electronic device to the first configuration of the electronic device; means for detecting a second user input, wherein the second user input represents a selection of the option; and means for, in response to detecting the second user input, sending data that includes instructions to cause the second electronic device to be set to the first configuration.

An electronic device includes a display unit configured to display a graphic user interface and a processing unit coupled to the display unit. The processing unit is configured to detect a first user input that sets the electronic device to operate in a first configuration associated with a plurality of operational parameters, where the operational parameters are associated with functions performed by the electronic device and a second electronic device remote from the electronic device and in a paired relationship with the electronic device. The processing unit is further configured to: display a user interface including an option to set a configuration of the plurality of operational parameters on the second electronic device to the first configuration of the electronic device; detect a second user input, wherein the second user input represents a selection of the option; and, in response to detecting the second user input, send data that includes instructions to cause the second electronic device to be set to the first configuration.

A first electronic device has a first touch-sensitive display and is in a paired relationship with a second electronic device that has a second display and is remote from the first electronic device. The first electronic device displays a user interface on the first touch-sensitive display. The user interface includes one or more representations of one or more locations on the second display. The first electronic device detects a user input on the first touch-sensitive display at a representation of a first location of the one or more locations on the second display, where the representation of the first location includes an affordance. While continuing to detect the user input on the first touch-sensitive display, the first electronic device detects movement of the user input from the representation of the first location of the one or more locations on the second display to a representation of a second location of the one or more locations on the second display. In response to detecting the movement of the user input from the representation of the first location to the representation of the second location, the first electronic device associates the affordance with the second location on the second display.

An electronic device includes a touch-sensitive display, one or more processors, a memory, and one or more programs. The one or more programs are stored in the memory and configured to be executed by the one or more processors. The one or more programs include instructions for displaying a user interface on the touch-sensitive display, where the user interface includes one or more representations of one or more locations on a second display of a second electronic device. The second electronic device is in a paired relationship with the electronic device and is remote from the electronic device. The one or more programs further include instructions for detecting a user input on the touch-sensitive display at a representation of a first location of the one or more locations on the second display, where the representation of the first location includes an affordance. The one or more programs further include instructions for, while continuing to detect the user input on the touch-sensitive display, detecting movement of the user input from the representation of the first location of the one or more locations on the second display to a representation of a second location of the one or more locations on the second display. The one or more programs further include instructions for, in response to detecting the movement of the user input from the representation of the first location to the representation of the second location, associating the affordance with the second location on the second display.

A non-transitory computer-readable storage medium stores one or more programs. The one or more programs include instructions, which when executed by one or more processors of a first electronic device with a first touch-sensitive display, cause the first electronic device to display a user interface on the first touch-sensitive display, where the user interface includes one or more representations of one or more locations on a second display of a second electronic device. The second electronic device is in a paired relationship with the first electronic device and is remote from the first electronic device. The first electronic device is further caused to detect a user input on the first touch-sensitive display at a representation of a first location of the one or more locations on the second display, where the representation of the first location includes an affordance, and, while continuing to detect the user input on the first touch-sensitive display, detect movement of the user input from the representation of the first location of the one or more locations on the second display to a representation of a second location of the one or more locations on the second display. In response to detecting the movement of the user input from the representation of the first location to the representation of the second location, the first electronic device is further caused to associate the affordance with the second location on the second display.

An electronic device includes a touch-sensitive display and means for displaying a user interface on the touch-sensitive display, where the user interface includes one or more representations of one or more locations on a second display of a second device. The second electronic device is in a paired relationship with the electronic device and is remote from the electronic device. The electronic device further includes means for detecting a user input on the first touch-sensitive display at a representation of a first location of the one or more locations on the second display, where the representation of the first location includes an affordance, and means for, while continuing to detect the user input on the first touch-sensitive display, detecting movement of the user input from the representation of the first location of the one or more locations on the second display to a representation of a second location of the one or more locations on the second display. The electronic device further includes means for, in response to detecting the movement of the user input from the representation of the first location to the representation of the second location, associating the affordance with the second location on the second display.

An electronic device includes a display unit configured to display a graphic user interface, a touch-sensitive surface unit configured to receive contacts, and a processing unit coupled to the display unit and the touch-sensitive surface unit. The processing unit is configured to enable display of a user interface on the touch-sensitive display, where the user interface includes one or more representations of one or more locations on a second display of a second electronic device. The second electronic device is in a paired relationship with the electronic device and is remote from the electronic device. The processing unit is further configured to detect a user input on the touch-sensitive display at a representation of a first location of the one or more locations on the second display, where the representation of the first location includes an affordance, and, while continuing to detect the user input on the first touch-sensitive display, detect movement of the user input from the representation of the first location of the one or more locations on the second display to a representation of a second location of the one or more locations on the second display. The processing unit is further configured to, in response to detecting the movement of the user input from the representation of the first location to the representation of the second location, associate the affordance with the second location on the second display.

Thus, devices are provided with faster, more efficient methods and interfaces for configuring an electronic device, thereby increasing the effectiveness, efficiency, and user satisfaction with such devices. Such methods and interfaces may complement or replace other methods for configuring an electronic device.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 4B illustrates an exemplary user interface for a multifunction device with a touch-sensitive surface that is separate from the display in accordance with some embodiments.

FIGS. 7A-10C illustrate exemplary user interfaces in accordance with some embodiments.

FIGS. 16-17B illustrate exemplary user interfaces in accordance with some embodiments.

FIG. 18 is a flow diagram illustrating a process for configuring an electronic device in accordance with some embodiments.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for configuring an electronic device. For example, a device may be used to configure settings on another device. In some embodiments, the former device may have a larger display than the later device, which may make it easier for a user to navigate and select settings. Such techniques can reduce the cognitive burden on a user who access event notifications, thereby enhancing productivity. Further, such techniques can reduce processor and battery power otherwise wasted on redundant user inputs.

Figure 10A:
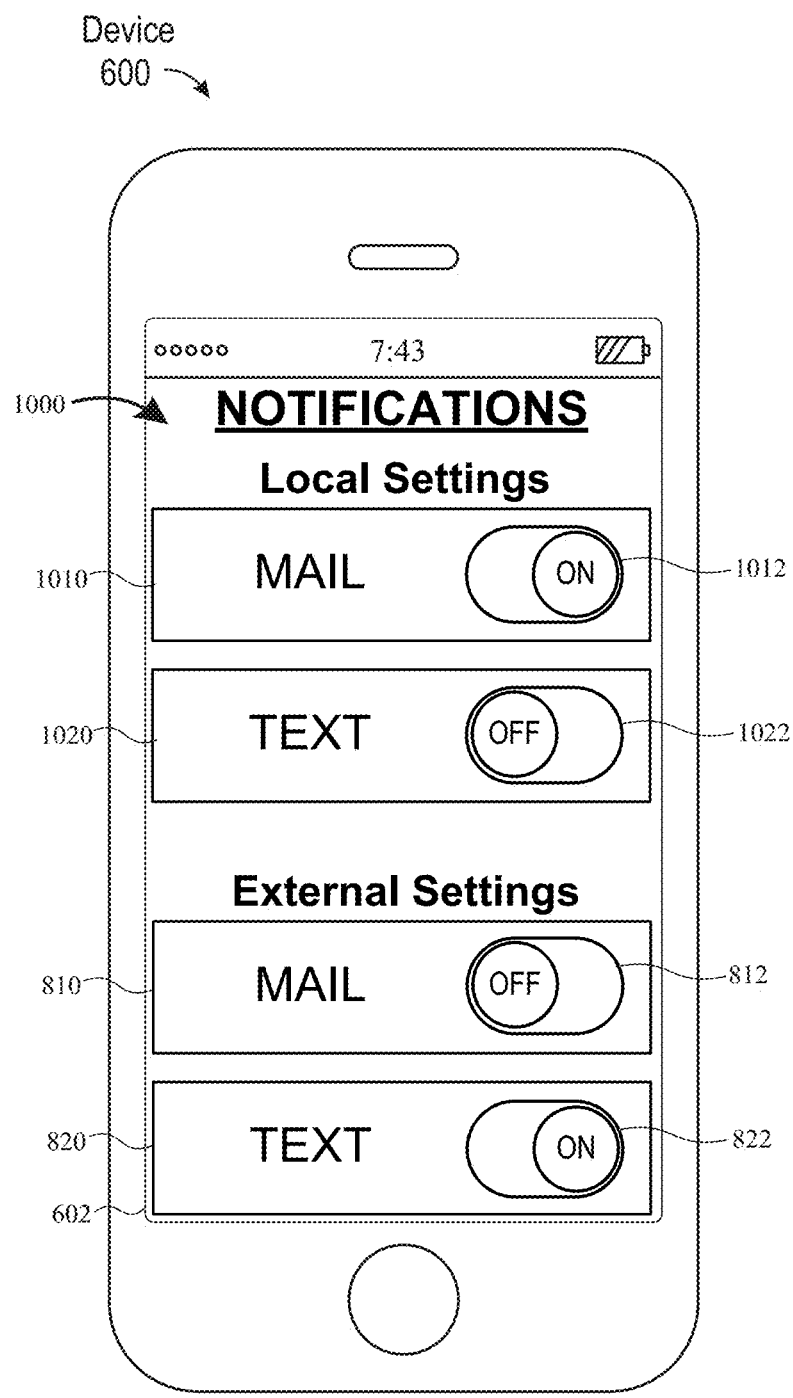
Figures 10B, 10C:
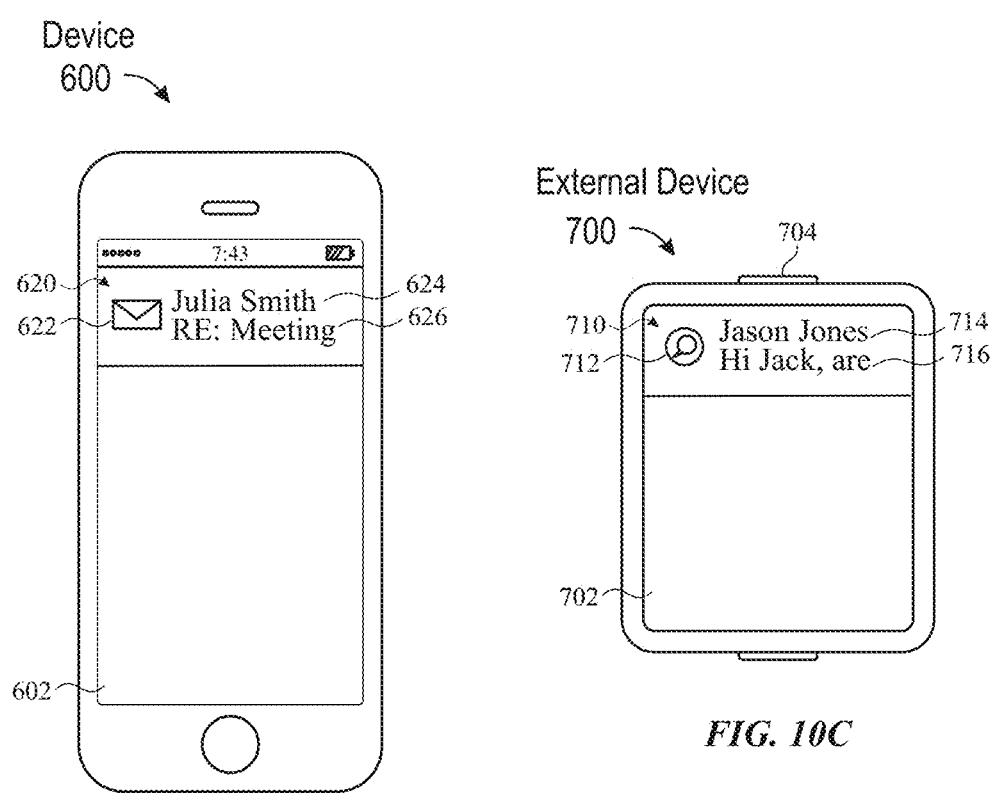
Figure 11:
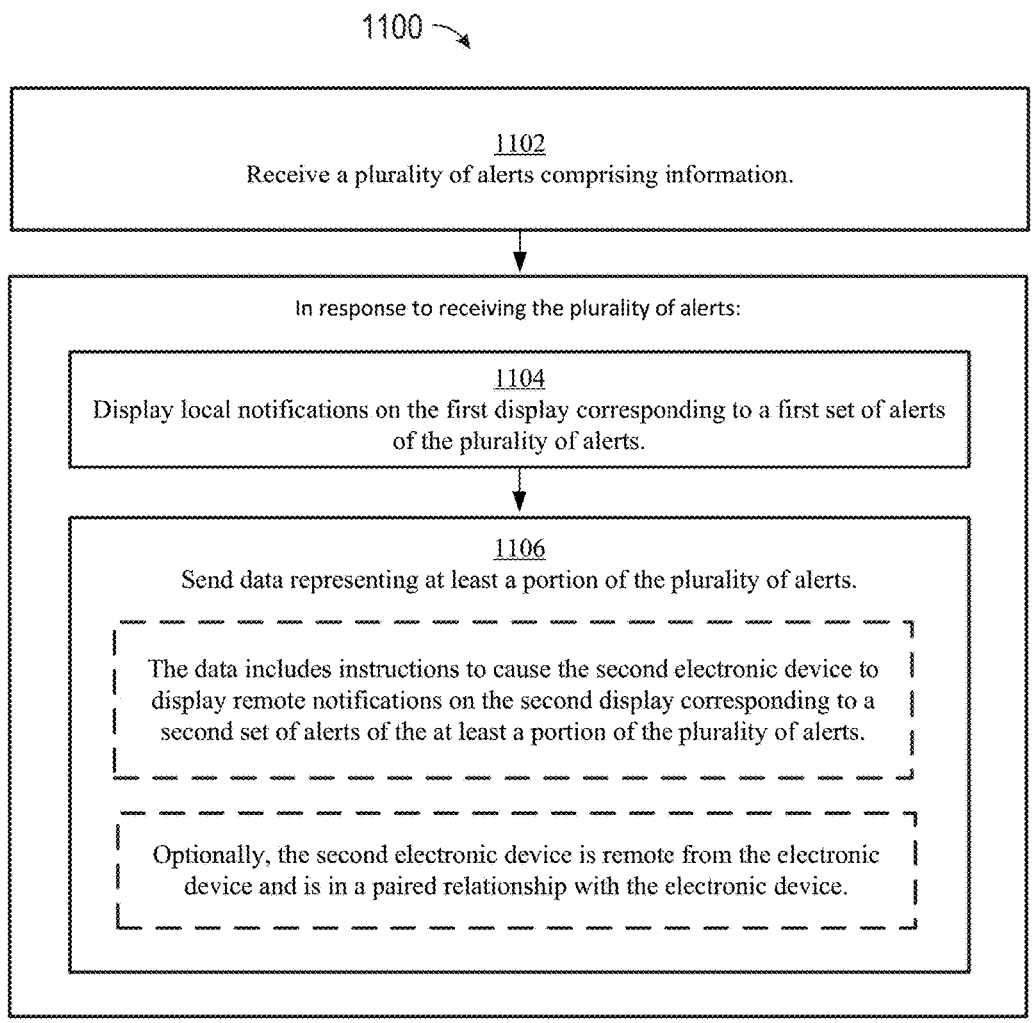
FIG. 11 is a flow diagram illustrating a process for configuring an electronic device in accordance with some embodiments.

Below, FIGS. 1A-1B, 2, 3, 4A-4B, and 5A-5B provide a description of exemplary devices for performing the techniques for configuring an electronic device. FIGS. 6-10C, 13A-13B, and 16-17B illustrate exemplary user interfaces for configuring an electronic device. FIGS. 11, 14, and 18 are flow diagrams illustrating methods of configuring an electronic device in accordance with some embodiments. The user interfaces in FIGS. 6-10C, 13A-13B, and 16-17B are used to illustrate the processes described below, including the processes in FIGS. 11, 14, and 18.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a", "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device may support a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
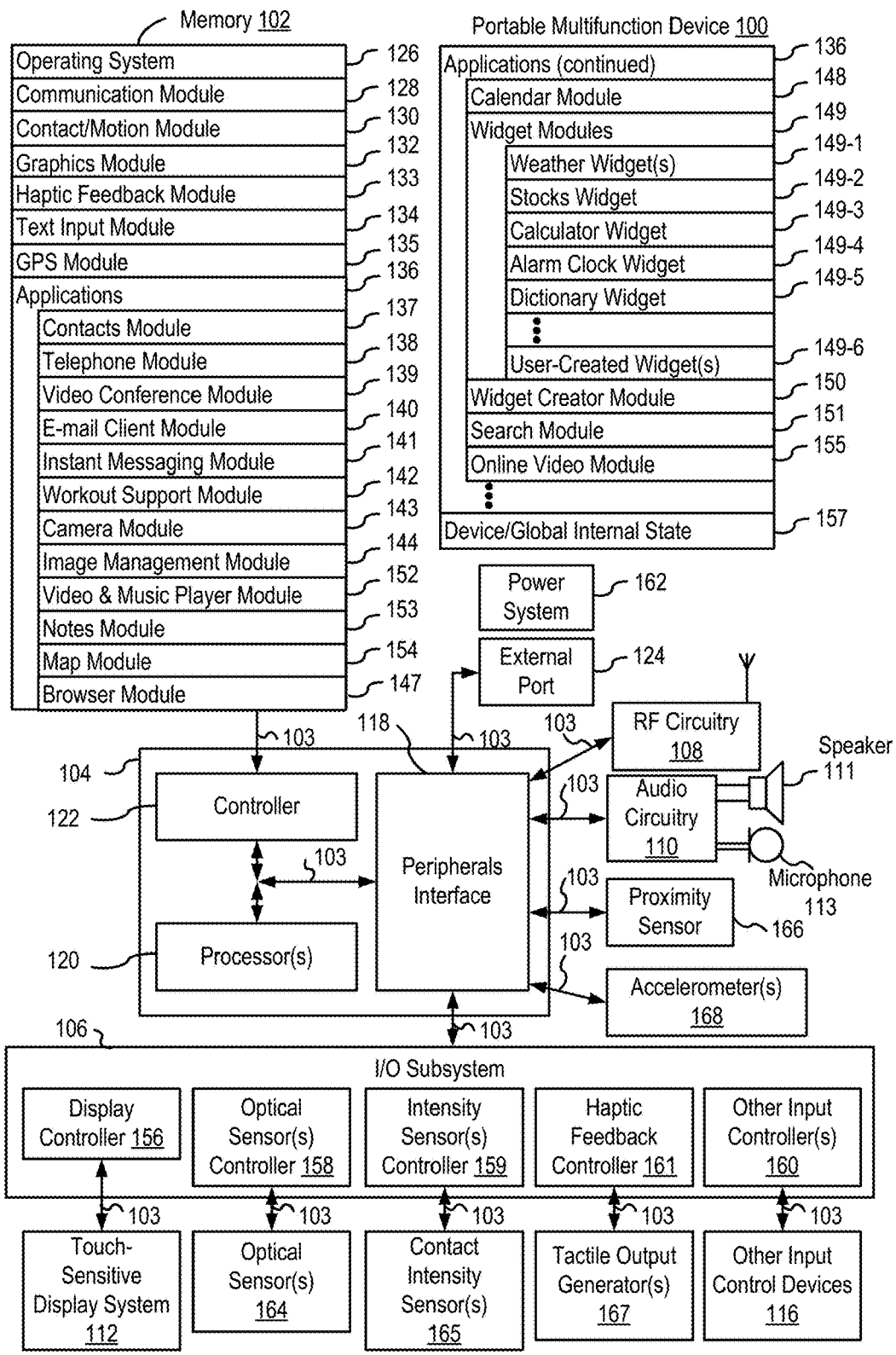
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 may include one or more computer-readable storage mediums. The computer-readable storage mediums may be tangible and non-transitory. Memory 102 may include high-speed random access memory and may also include non-volatile memory, such as one or more magnetic disk storage devices, flash memory devices, or other non-volatile solid-state memory devices. Memory controller 122 may control access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button may disengage a lock of touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) may turn power to device 100 on or off. The user may be able to customize a functionality of one or more of the buttons. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 may use LCD (liquid crystal display) technology, LPD (light emitting polymer display) technology, or LED (light emitting diode) technology, although other display technologies may be used in other embodiments. Touch screen 112 and display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 may be analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 may have a video resolution in excess of 100 dpi. In some embodiments, the touch screen has a video resolution of approximately 160 dpi. The user may make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 may also include one or more optical sensors 164. FIG. 1A shows an optical sensor coupled to optical sensor controller 158 in I/O subsystem 106. Optical sensor 164 may include charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 may capture still images or video. In some embodiments, an optical sensor is located on the back of device 100, opposite touch screen display 112 on the front of the device so that the touch screen display may be used as a viewfinder for still and/or video image acquisition. In some embodiments, an optical sensor is located on the front of the device so that the user's image may be obtained for video conferencing while the user views the other video conference participants on the touch screen display. In some embodiments, the position of optical sensor 164 can be changed by the user (e.g., by rotating the lens and the sensor in the device housing) so that a single optical sensor 164 may be used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 may also include one or more proximity sensors 166. FIG. 1A shows proximity sensor 166 coupled to peripherals interface 118. Alternately, proximity sensor 166 may be coupled to input controller 160 in I/O subsystem 106. Proximity sensor 166 may perform as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 may also include one or more accelerometers 168. FIG. 1A shows accelerometer 168 coupled to peripherals interface 118. Alternately, accelerometer 168 may be coupled to an input controller 160 in I/O subsystem 106. Accelerometer 168 may perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
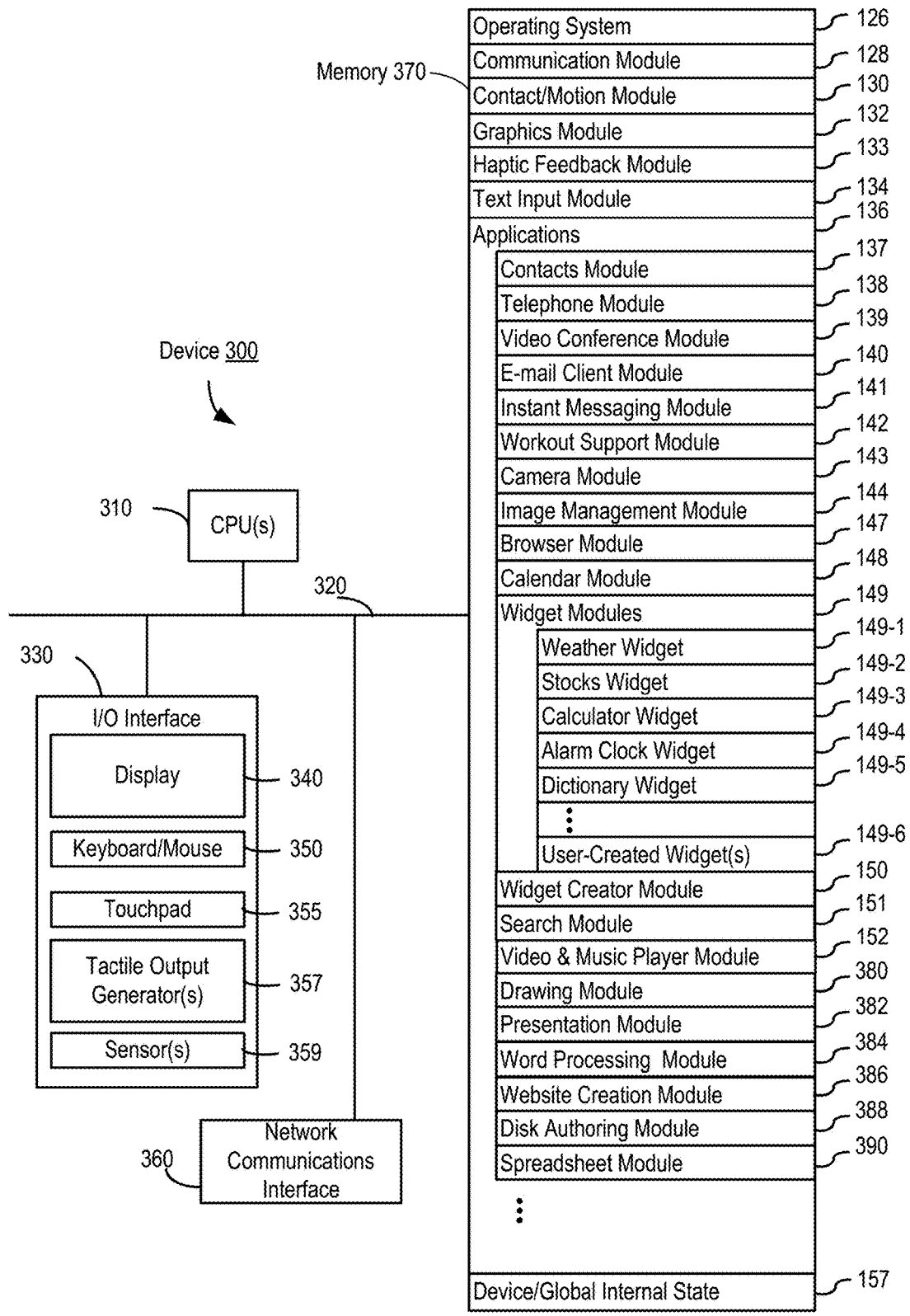
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/ motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which may be a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 may include the following modules (or sets of instructions), or a subset or superset thereof:
  Contacts module 137 (sometimes called an address book or contact list);
  Telephone module 138;
  Video conference module 139;
  E-mail client module 140;
  Instant messaging (IM) module 141;
  Workout support module 142;
  Camera module 143 for still and/or video images;
  Image management module 144;

Video player module;
Music player module;
Browser module 147;
Calendar module 148;
Widget modules 149, which may include one or more of: weather widget 149-1, stocks widget 149-2, calculator widget 149-3, alarm clock widget 149-4, dictionary widget 149-5, and other widgets obtained by the user, as well as user-created widgets 149-6;
Widget creator module 150 for making user-created widgets 149-6;
Search module 151;
Video and music player module 152, which merges video player module and music player module;
Notes module 153;
Map module 154; and/or
Online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 may be used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 may be used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication may use any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages may include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 may be used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 may be used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules may be combined or otherwise rearranged in various embodiments. For example, video player module may be combined with music player module into a single module (e.g., video and music player module 152, FIG. 1A). In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
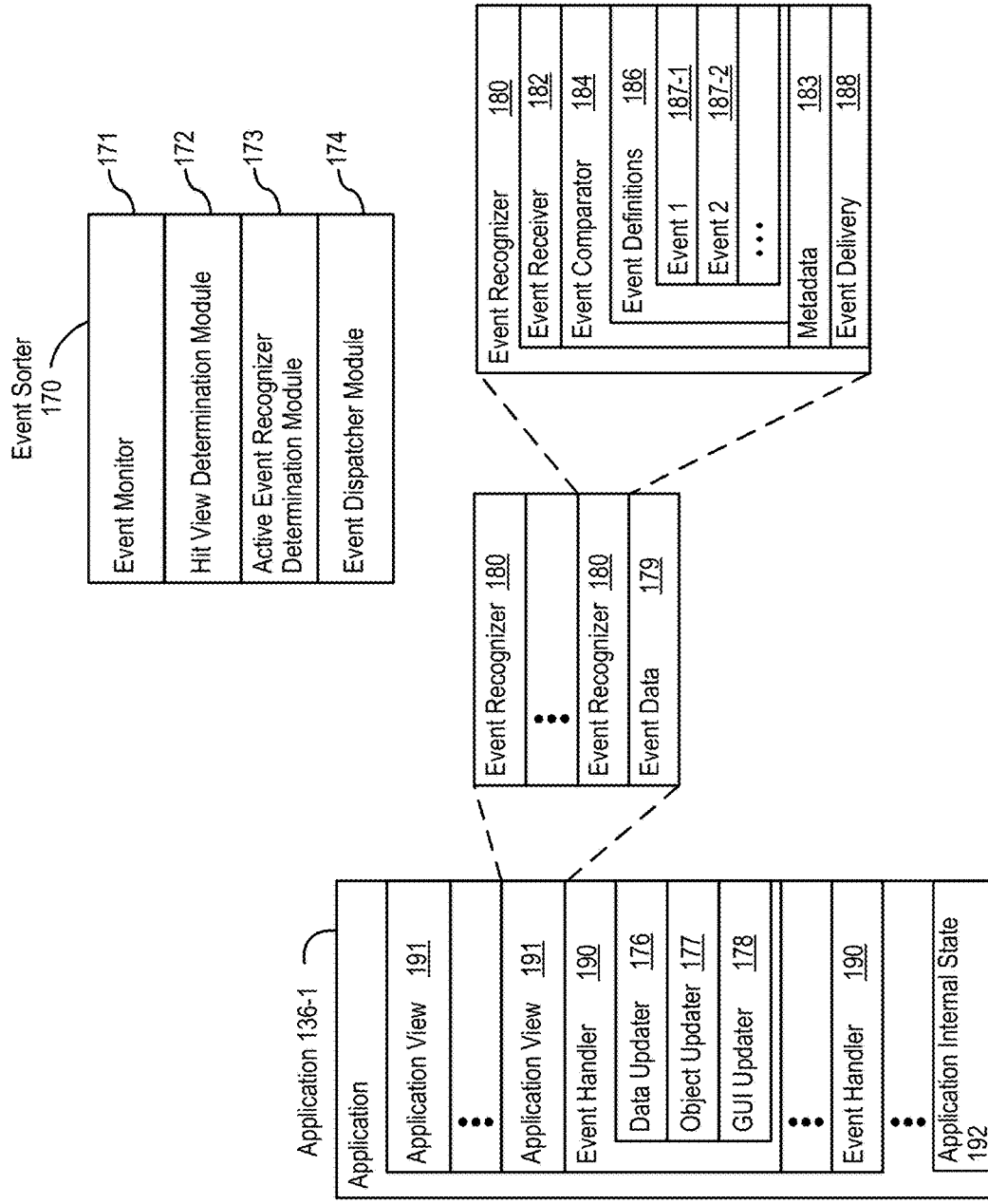
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected may correspond to programmatic levels within a programmatic or view hierarchy of the application. For example, the lowest level view in which a touch is detected may be called the hit view, and the set of events that are recognized as proper inputs may be determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 may utilize or call data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which may include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information may also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers may interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
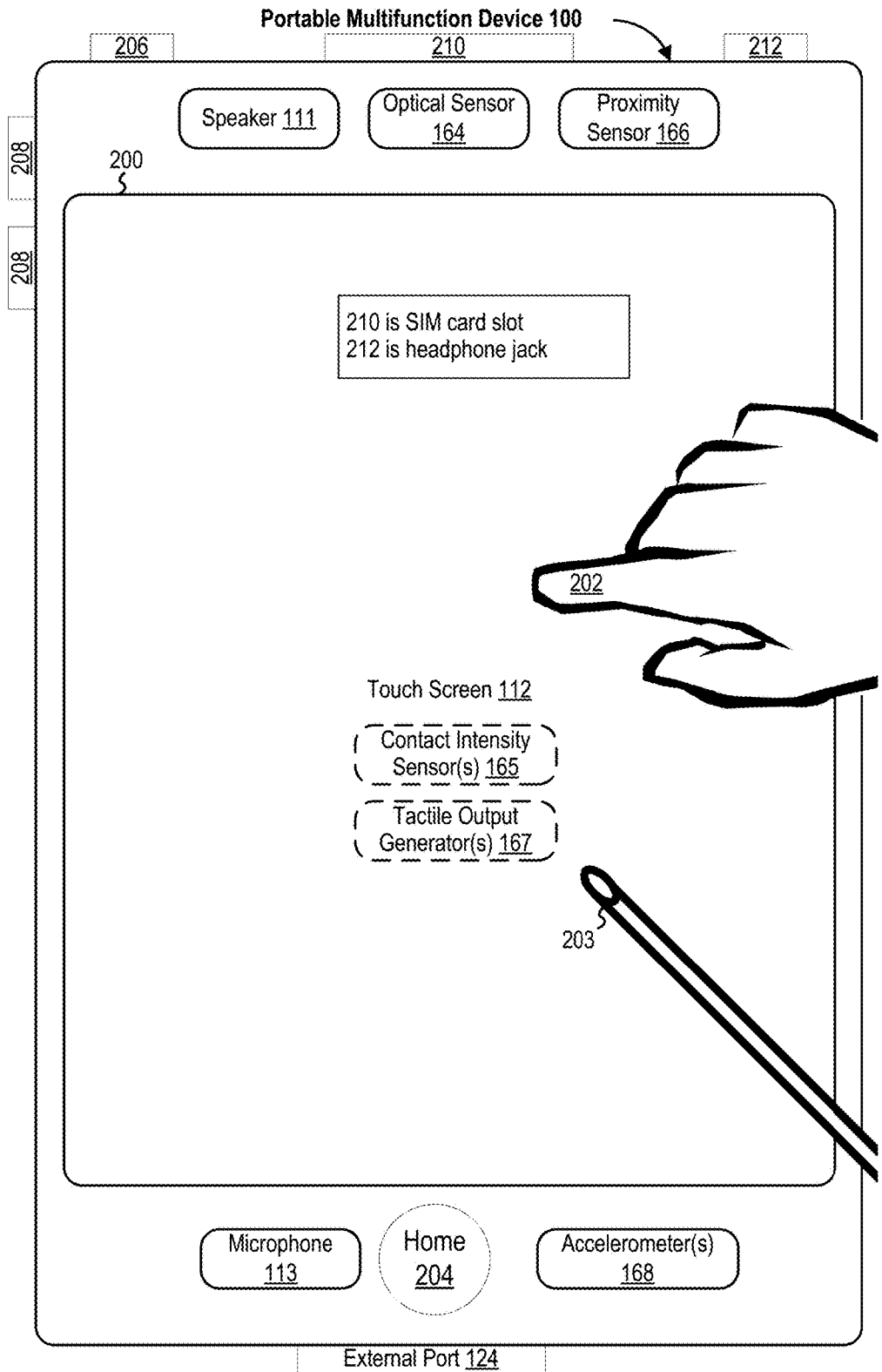
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 may also include one or more physical buttons, such as "home" or menu button 204. As described previously, menu button 204 may be used to navigate to any application 136 in a set of applications that may be executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 may be stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules may be combined or otherwise rearranged in various embodiments. In some embodiments, memory 370 may store a subset of the modules and data structures identified above. Furthermore, memory 370 may store additional modules and data structures not described above.

Attention is now directed towards embodiments of user interfaces that may be implemented on, for example, portable multifunction device 100.

Figure 4A:
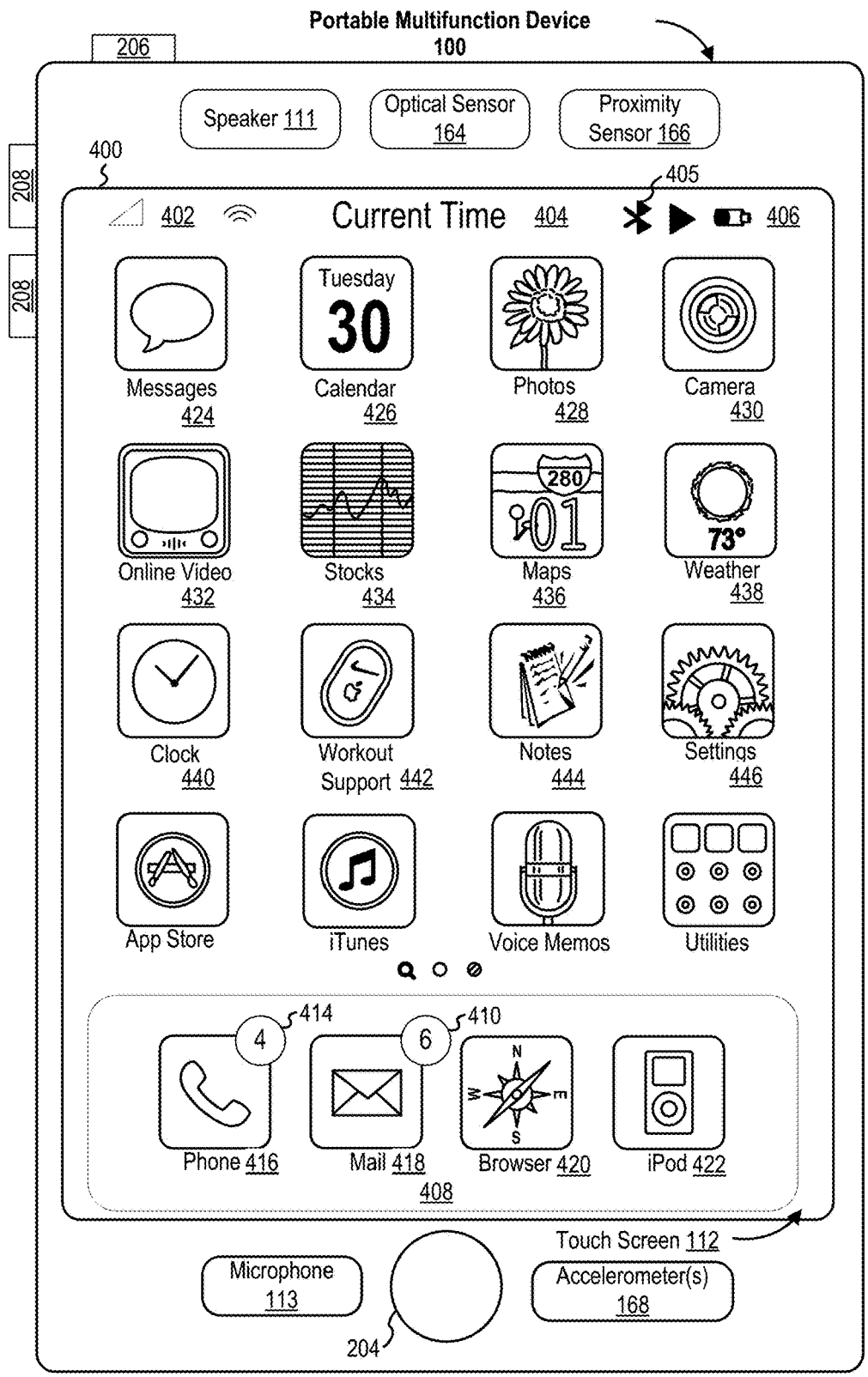
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces may be implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 may optionally be labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 357) for detecting intensity of contacts on touch-sensitive surface 451 and/or one or more tactile output generators 359 for generating tactile outputs for a user of device 300.

Although some of the examples which follow will be given with reference to inputs on touch screen display 112

(where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
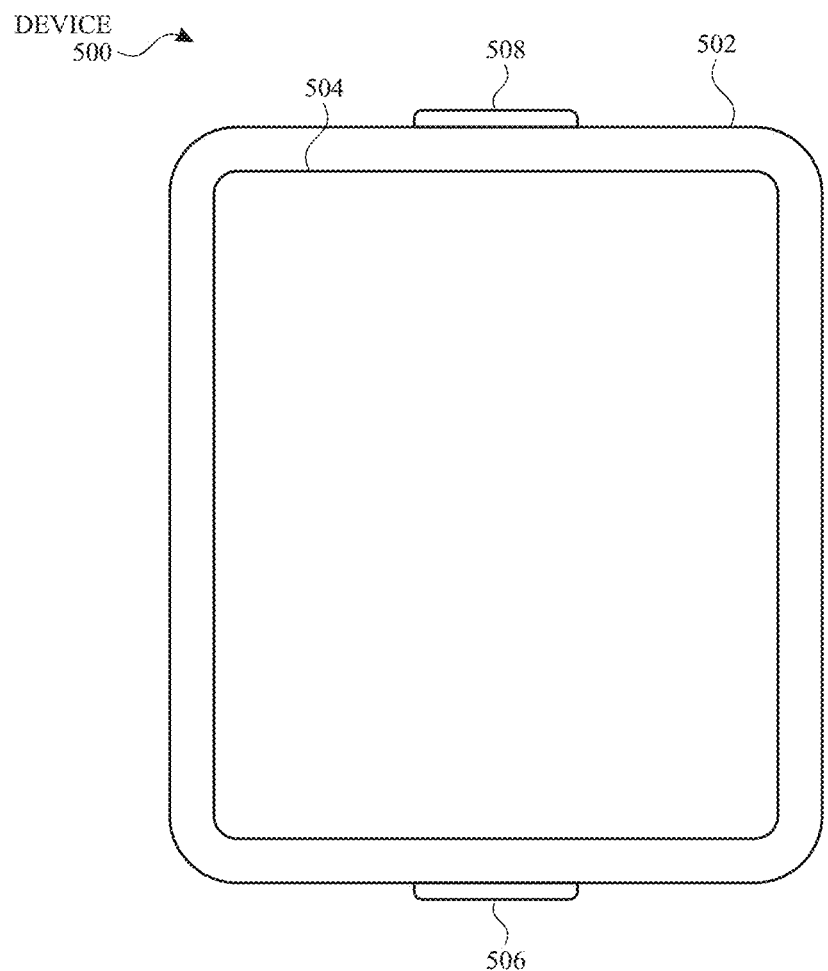
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) may have one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Techniques for detecting and processing touch intensity may be found, for example, in related applications: International Patent Application Serial No. PCT/US2013/040061, titled "Device, Method, and Graphical User Interface for Displaying User Interface Objects Corresponding to an Application," filed May 8, 2013, and International Patent Application Serial No. PCT/US2013/069483, titled "Device, Method, and Graphical User Interface for Transitioning Between Touch Input to Display Output Relationships," filed Nov. 11, 2013, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms may permit device 500 to be worn by a user.

Figure 5B:
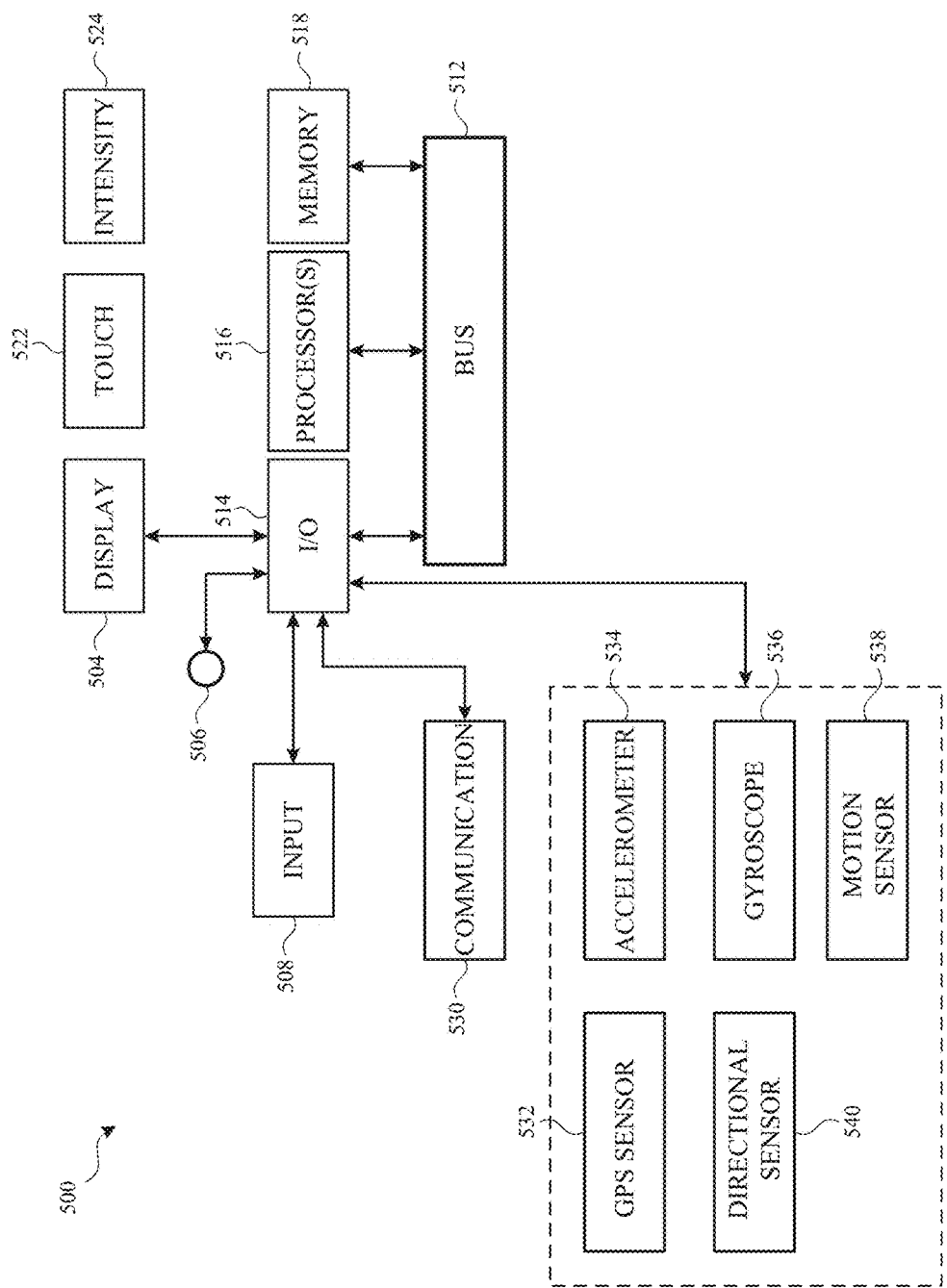
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, touch-intensity sensitive component 524. In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 may be a rotatable input device, for example. Input mechanism 508 may be a button, in some examples.

Input mechanism 508 may be a microphone, in some examples. Personal electronic device 500 can include various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can be a non-transitory computer-readable storage medium, for storing computer-executable instructions, which, when executed by one or more computer processors 516, for example, can cause the computer processors to perform the techniques described above, including processes 1100, 1400, and 1800 (FIGS. 11, 14, and 18). The computer-executable instructions can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. For purposes of this document, a "non-transitory computer-readable storage medium" can be any medium that can tangibly contain or store computer-executable instructions for use by or in connection with the instruction execution system, apparatus, or device. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that may be displayed on the display screen of devices 100, 300, and/or 500 (FIGS. 1, 3, and 5). For example, an image (e.g., icon), a button, and text (e.g., hyperlink) may each constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds may include a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation) rather than being used to determine whether to perform a first operation or a second operation.

In some embodiments, a portion of a gesture is identified for purposes of determining a characteristic intensity. For example, a touch-sensitive surface may receive a continuous swipe contact transitioning from a start location and reaching an end location, at which point the intensity of the contact increases. In this example, the characteristic intensity of the contact at the end location may be based on only a portion of the continuous swipe contact, and not the entire swipe contact (e.g., only the portion of the swipe contact at the end location). In some embodiments, a smoothing algorithm may be applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface may be characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

Attention is now directed towards embodiments of user interfaces ("UI") and associated processes that may be implemented on an electronic device, such as portable multifunction device 100, device 300, or device 500.

1. Customized Notification Parameters

Exemplary techniques and user interfaces for configuring notification parameters in accordance with some embodiments are described below with reference to FIGS. 6-10C. The user interfaces in these figures are used to illustrate the processes described below, including the processes in FIG. 11.

Figure 6:
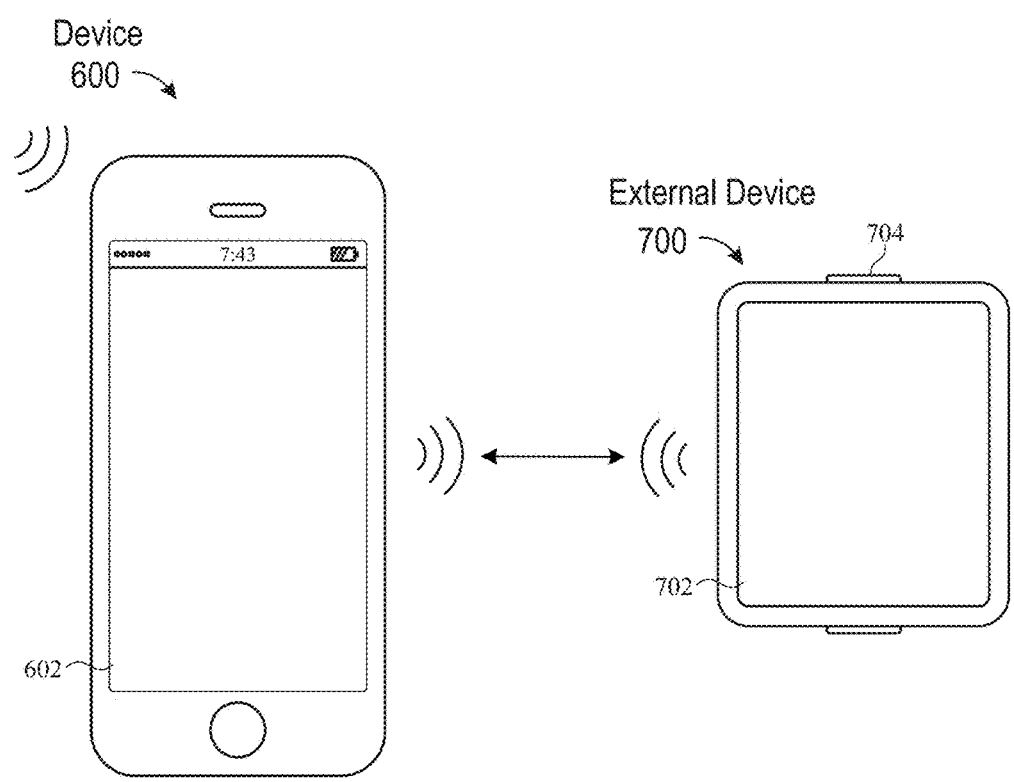
FIG. 6 illustrates exemplary electronic devices in accordance with some embodiments.

FIG. 6 illustrates an exemplary electronic device 600 and an exemplary external electronic device 700 remote from device 600. In some embodiments, device 600 may be one or more of devices 100 (FIG. 1), 300 (FIG. 3), and/or 500 (FIG. 5). For purposes of illustration, device 600 is a personal electronic device, similar to portable multifunction device 100 as depicted in FIG. 4A, with a touch-sensitive display 602. In some embodiments, external device 700 may be one or more of devices 100 (FIG. 1), 300 (FIG. 3), and/or 500 (FIG. 5). For purposes of illustration, external device 700 is a personal electronic device, similar to device 500 as depicted in FIG. 5A, with a touch-sensitive display 702 and a rotatable input mechanism 704.

As depicted in FIG. 6, device 600 is capable of receiving information over a wireless network. FIG. 6 also indicates that device 600 is capable of operating in a paired relationship with external device 700 to exchange data between the two devices. In a paired relationship, device 600 and external device 700 are registered with one another and can perform two-way wireless communication. In some embodiments, wireless communication, for purposes of a paired relationship, occurs over a peer-to-peer wireless communication protocol such as Bluetooth and/or Bluetooth Low Energy (BTLE). In some embodiments, the wireless communication uses more than one wireless communication protocol. For example, WiFi may be used in addition to BTLE. In these embodiments, an initial communication between two devices may occur over a lower powered protocol, such as BTLE, even if the protocol yields a slower data transfer speed. Subsequent communications may occur over a secondary network that is relatively faster, such as WiFi. Additional exemplary techniques related to initiating and operating in a paired relationship are described in the following co-pending applications: U.S. Provisional Patent Application Ser. No. 62/005,793, titled "Companion Application for Activity Cooperation," filed May 30, 2014; U.S. Provisional Patent Application Ser. No. 62/005,751, titled "Predefined Wireless Pairing," filed May 30, 2014; U.S.

Provisional Patent Application Ser. No. 62/044,956 titled "Reduced-size Configuration Interface," filed Sep. 2, 2014; and U.S. Provisional Patent Application titled "Reduced-size Configuration Interface," filed Mar. 8, 2015, naming Lawrence Y. Yang et al. as inventors.

In some embodiments, device 600 can receive alerts. Device 600 can receive alerts from installed applications running on device 600, or can receive alerts from installed applications running on an external device that is in communication with device 600, for example. In some embodiments, device 600 receives alerts by receiving the alerts from an application or an external device.

In some embodiments, an alert can be a text message, calendar alert, voicemail, clock alarm, system alert, weather alert, email, or fitness alert, for example. An alert may be associated with a date and a time, referred to as a "date-time," that characterizes the date and time the alert was sent or received, or the date and time of an upcoming alert event, for example. An alert date-time may be a future (e.g., upcoming) date-time or a past date-time, relative to the current date and time. An alert date-time may be a timestamp assigned to the alert by device 600 or by an external device, or may be a date and time assigned within an application (e.g., a date and time associated with a calendar reminder or clock alarm). An alert may be a timeless alert; that is, an alert that is not associated with a specific date-time, such as a task reminder or location-based alert that is triggered when device 600 is in a specific location, or within a predefined geofence.

A received alert may include information, such as a source (e.g., a device or user) of the alert, an application corresponding to the alert, a date-time, and alert content. The alert content may include the body of a text message, the subject and/or body of an email, a voicemail message, an image, an audio recording, or text associated with a calendar reminder, for example.

In some embodiments, in response to receiving alerts, device 600 displays one or more notifications on display 602 representing one or more of the received alerts. That is, device 600 displays notifications corresponding to a set of alerts of the received alerts. A notification representing an alert may include at least a portion of the alert information. FIG. 7A depicts exemplary notifications 610 and 620 displayed on display 602 of device 600 representing alerts received by device 600. Notifications 610 and 620 may represent some or all of the alerts received by device 600.

As depicted in FIG. 7A, notifications 610, 620 each include an application affordance 612, 622 indicating an application associated with the corresponding alert. In this example, the alerts represented by notifications 610 and 620 are associated with a text message application and an email application, respectively. In some embodiments, in response to detecting a selection of application affordance 612 or 622, device 600 can launch an application associated with the respective alert. In some embodiments, launching an application includes displaying the application on touchscreen 602 and opening the alert for viewing, editing, or responding within the application.

Notifications 610, 620 also include a source 614, 624 of the respective alert (Jason Jones and Julia Smith) and a portion of the content 616, 626 of the respective alert. The portion of content 616 includes the beginning of the body of a text message associated with notification 610. The portion of content 626 includes the beginning of the subject of an email associated with notification 620. In some embodiments, device 600 displays more than one notification at a time (e.g., as depicted in FIG. 7A). In some embodiments, notifications 610 and 620 are displayed sequentially based on the order in which their respective alerts are received.

Exemplary techniques related to alerts and notifications, such as, for example, managing alerts, displaying notifications, and interacting with notifications, are described in the following co-pending applications: U.S. Provisional Patent Application Ser. No. 62/044,894 titled "Reduced-size Interfaces for Managing Alerts," filed Sep. 2, 2014; U.S. Provisional Patent Application titled "Reduced-size Interfaces for Managing Alerts," filed Mar. 7, 2014, naming Lawrence Y. Yang et al. as inventors; U.S. Provisional Patent Application Ser. No. 62/044,953 titled "Reduced-size Notification Interface," filed Sep. 2, 2014; and U.S. Provisional Patent Application titled "Reduced-size Notification Interface," filed Mar. 8, 2015, naming Jonathan R. Dascola et al. as inventors, which are hereby incorporated by reference in their entirety.

In some embodiments, device 600 sends data representing at least a portion of the received alerts. In some embodiments, device 600 sends the data in response to receiving the alerts. In the example depicted in FIGS. 7A-7B, device 600 sends data representative of the alerts represented by notifications 610 and 620. The data may be sent to external device 700 via a communication link between device 600 and external device 700. In some embodiments, the communication link exists as a result of device 600 and external device 700 operating in a paired relationship.

In some embodiments, the data representing at least a portion of the received alerts (e.g., a first set of alerts) includes instructions to cause external device 700 to display notifications corresponding to at least a portion of the alerts represented by the data sent by device 600 (e.g., a second set of alerts). In the example depicted in FIGS. 7A-7B, device 600 sends data representing the two alerts associated with notifications 610 and 620. The data includes instructions to cause external device 700 to display notifications for both alerts. External device 700 receives the data and, in response to receiving the data, displays exemplary notifications 710 and 720 in accordance with the instructions.

Notifications 710 and 720 represent the alerts represented by the data sent by device 600. Furthermore, notification 710 represents the same alert represented by notification 610 displayed on device 600, and notification 720 represents the same alert represented by notification 620. For purposes of this disclosure, notifications displayed on display 602 of device 600 (e.g., 610, 620) are referred to as "local notifications," and notifications displayed on display 702 of external device 700 (e.g., 710, 720) are referred to as "remote notifications."

As depicted in FIG. 7B, notifications 710, 720 have the same style and format as notifications 610 and 620, respectively. Each includes an application affordance 712, 722 indicating an application associated with the corresponding alert (e.g., a text message application and an email application, respectively). In some embodiments, in response to detecting a selection of application affordance 712 or 722, device 700 can launch an application associated with the respective alert. In some embodiments, launching an application includes displaying the application on touchscreen 702 and opening the alert for viewing, editing, or responding within the application.

Notifications 710, 720 also include a source 714, 724 of the respective alert (Jason Jones and Julia Smith) and a portion of the content 716, 726 of the respective alert, which are displayed in the same style and format as notifications 610, 620. In some embodiments, external device 700 displays more than one notification at a time (e.g., as depicted in FIG. 7B). In some embodiments, notifications 710 and 720 are displayed sequentially based on the order in which their respective alerts were received, or based on the order in which the data sent by device 600 representing the respective alerts was received.

In some embodiments, device 600 provides a user interface that allows a user to set parameters associated with the display of notifications on external device 700. A parameter associated with the display of notifications on external device 700 is referred to as a remote notification parameter. A remote notification parameter may determine whether, and/or the manner in which, remote notifications are displayed. The ability to change the settings of remote notification parameters may allow a user to customize the notifications displayed on device 700.

Figure 8A:
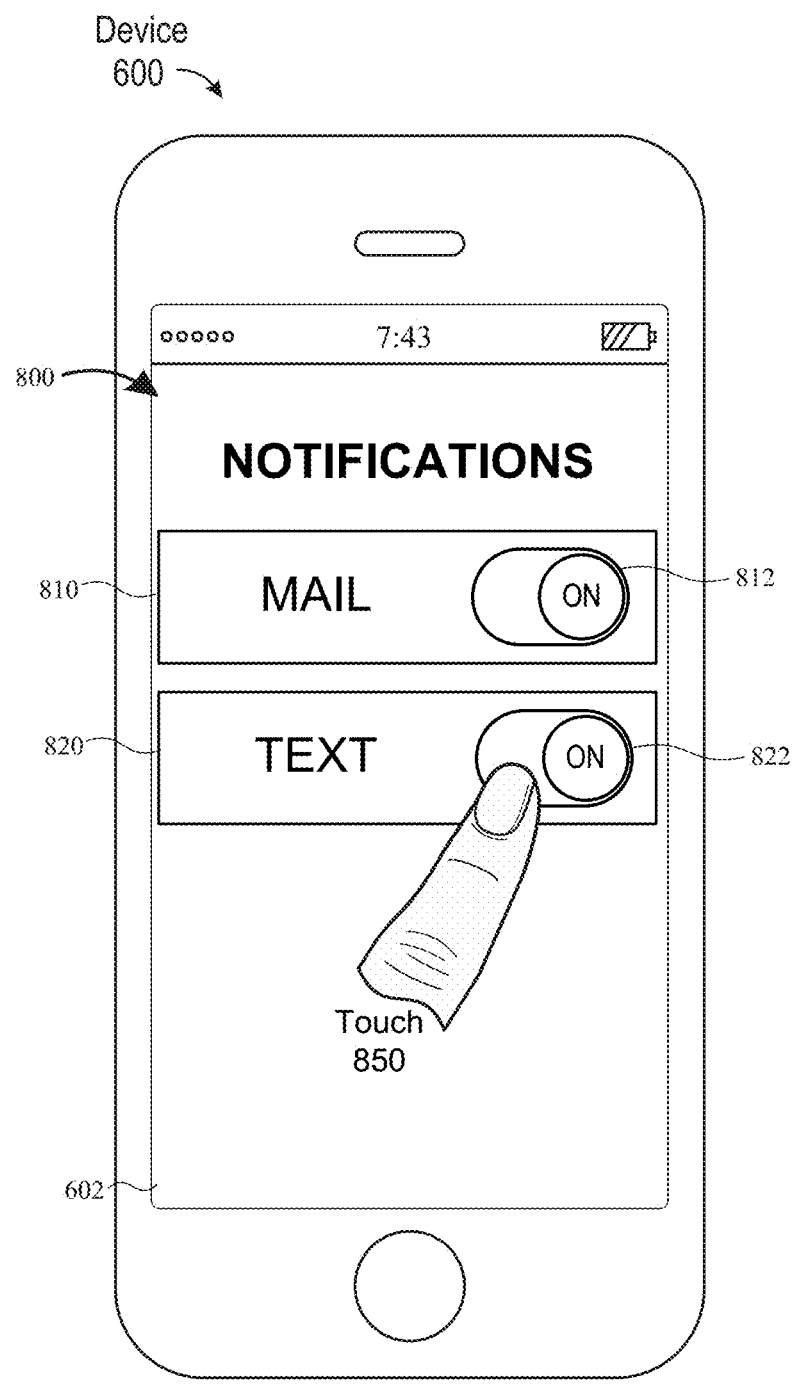

In some embodiments, device 600 displays a user interface including an option to set a state of a remote notification parameter. FIG. 8A depicts an exemplary user interface 800 including an option to set states of remote notification parameters associated with applications. Representation 810 is associated with the mail application and representation 820 is associated with of the text messaging application. Representation 810 includes a graphical toggle switch 812, which can switch between an ON position and an OFF position in response to user input. In some embodiments, the position of switch 812 is changed in response to detecting a contact on display 602. The contact may be caused by a touch gesture such as a tap, drag, swipe, or flick on or in the proximity of switch 812. In some embodiments, the position of switch 812 sets the state of a remote notification parameter that determines whether alerts associated with the email application are to be displayed on external device 700. Representation 820 also includes a graphical toggle switch 822, the position of which indicates the state of a remote notification parameter that determines whether alerts associated with the text messaging application are to be displayed on external device 700.

Remote notifications may be displayed on display 702 of external device 700 in accordance with the state of the remote notification parameters associated with representations 810 and 820. In some embodiments, device 600 sends data representing at least a portion of the received alerts in accordance with the state of the remote notification parameters associated with representations 810 and 820. For example, in FIG. 8A, the remote notification parameters associated with the email application and the text messaging application are both set to an ON state. In accordance with this configuration, device 600 sends data representing received alerts of the email application and the text messaging application. The data also includes instructions to display notifications representing the alerts of those applications. In accordance with this configuration, external device 700 may display notifications representing alerts of the email application and the text messaging application. FIG. 7B depicts an example in which external device 700 displays notifications 710, 720 representing alerts associated with the text messaging application and the email application, respectively.

Figure 8B:
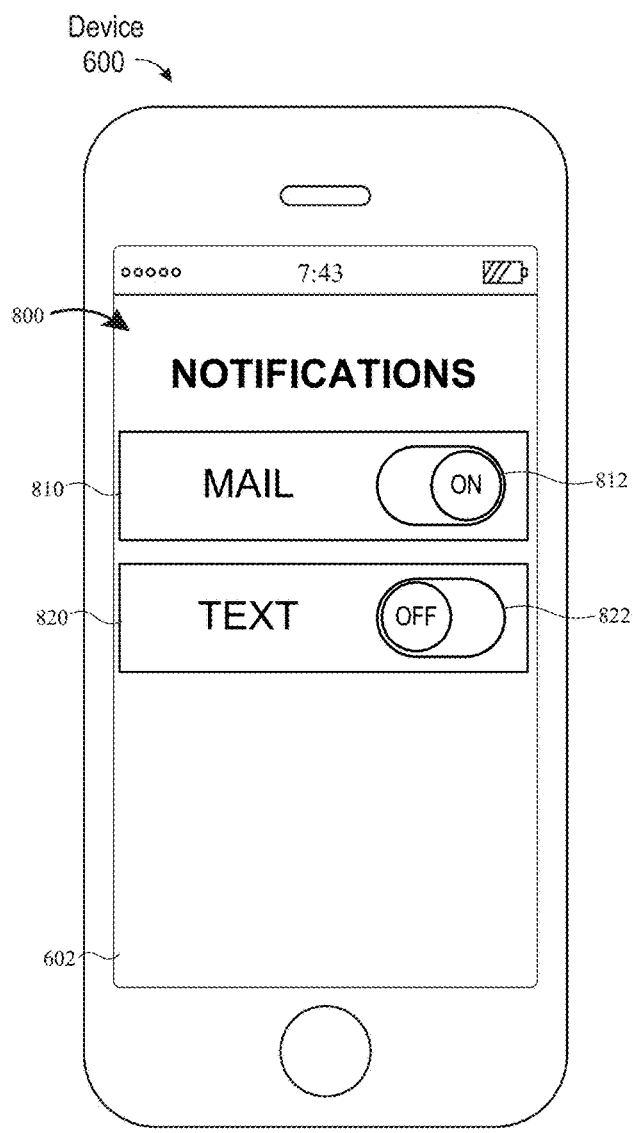
Figure 8C:
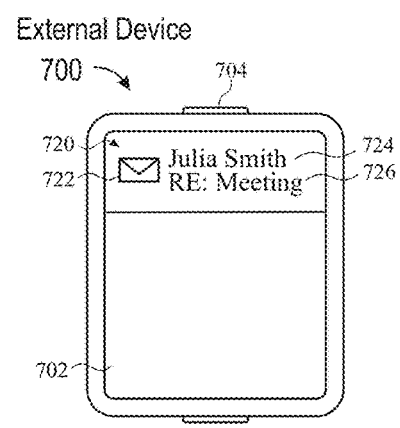

In some embodiments, while displaying user interface 800, device 600 detect a user input, where the user input represents a selection of a state of a remote notification parameter. For example, device 600 may detect a contact on touch-sensitive display 602 associated with representation 820. In FIG. 8A, touch 850 causes a contact at or near switch 822. In response to the contact, device 600 changes switch 822 from the ON position to the OFF position, as depicted in FIG. 8B. In response to the contact, device 600 can set a remote text notification parameter associated with representation 820 so that notifications of alerts from the text messaging application are not displayed on external device 700. FIG. 8C illustrates an example in which external device 700 does not display notification 710 associated with the text messaging application, but displays notification 720 associated with the email application. In some embodiments, in accordance with this configuration of the remote text notification parameter, device 600 does not send data including representations of alerts associated with the text messaging application. In some embodiments, external device 700 does not display notifications of alerts received from device 600 associated with the text messaging application.

In some embodiments, remote notification parameters are stored on device 600, in which case, device 600 sets the remote notification parameters to the selected state within device 600 in response to user input. In some embodiments, the remote notification parameters are stored on device 700. In some embodiments, in response to the user input, device 600 sends data that includes instructions to cause external device 700 to set the remote notification parameters on device 700 to the selected state. In response to receiving the instructions, device 700 may set the remote notification parameters on device 700 to the selected state.

Notifications may be displayed based on various other factors besides the application associated with the alert. For example, a remote notification parameter may be set to a state such that remote notifications from a particular contact are not displayed.

In some embodiments, notifications are displayed in accordance with remote notification parameters related to the content of the alert. User interface 900 depicted in FIG. 9A, for example, allows a user to adjust remote notification parameters associated with an email application. Representation 910 represents a parameter that determines whether notifications associated with alerts of the email application are displayed on external device 700. Representations 920, 930, and 940 represent parameters associated with alert content that determine the display format of notifications associated with alerts of the email application. More specifically, representations 920, 930, and 940 affect which content of the alert is included in the notification. Representation 920 represents a parameter that determines whether the subject of the alert is included; representation 930 represents a parameter that determines whether a preview of the body of the alert is included; and representation 940 represents a parameter that determines whether the time the alert was received by device 600 is included.

Figure 9B:
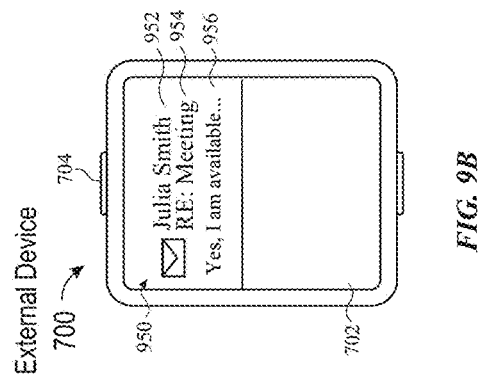
Figure 9A:
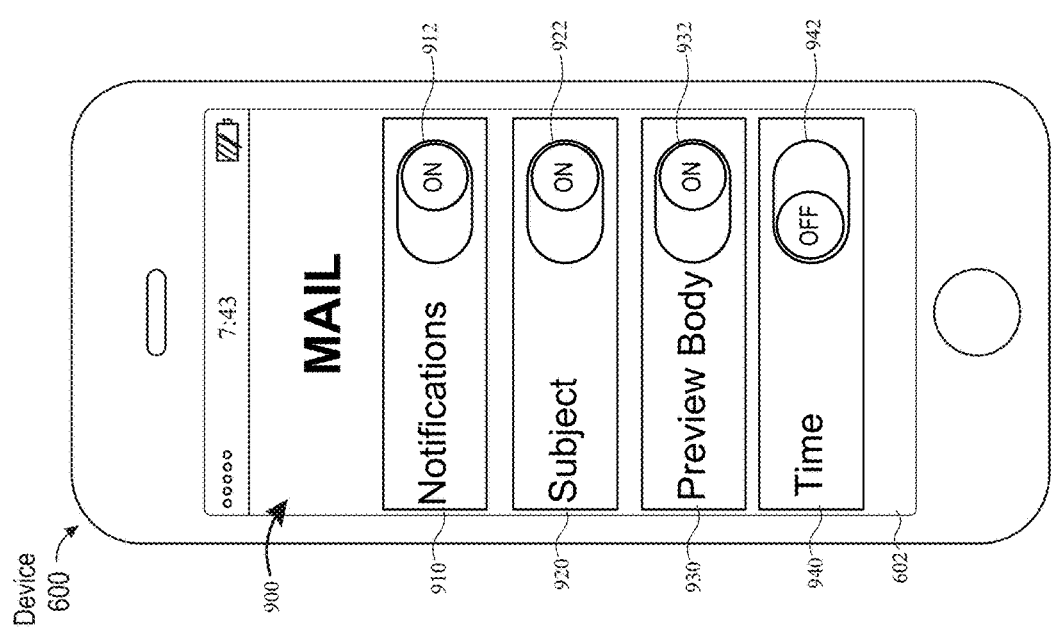

FIG. 9B depicts notification 950 displayed on external device 700 in accordance with the configuration of remote notification parameters selected on user interface 900. Notification 950 represents an alert of the same email from Julia Smith represented by notifications 620 and 720. In accordance with the parameters corresponding to representations 920, 930, and 940, notification 950 includes the subject and a preview of the email, but does not include the time. In this case, the remote notification (e.g., 950) includes a different portion of the information of an alert than the portion included in a local notification (e.g., 620) of the same alert.

FIGS. 9C and 9D depict another exemplary configuration of the remote notification parameters represented on user interface 900 and a corresponding notification 960 displayed on external device 700 for the same email associated with notification 950. In accordance with the settings of the parameters in FIG. 9C, notification 960 includes the subject and time of the email, but does not include a preview of the body.

Notification 960 also illustrates that notifications can be displayed in a different style on external device 700 than on device 600. The style of a notification may include visual aspects of a notification, such as shape, color, font, or position, as well as which portions of the alert information are included in the notification. In some embodiments, device 600 displays a user interface that provides options to customize the style of the notifications displayed on device 700. For example, device 600 may provide an option to adjust a state of a remote notification style parameter associated with the display style of the remote notifications. In some embodiments, device 700 is instructed to display notifications in a different style than device 600 according to the state of the remote notification style parameter.

Figure 9E:
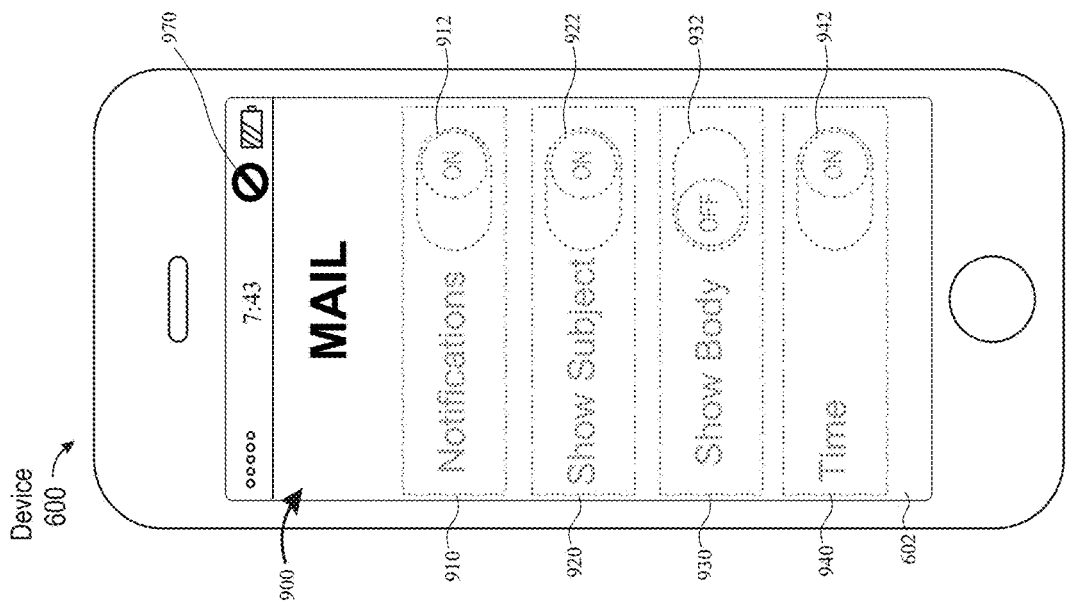

FIG. 9E depicts yet another exemplary configuration of the remote notification parameters represented on user interface 900. As indicated by the position of switch 912, remote notifications are turned off for alerts of the email application. That is, the remote notification parameter that determines whether external device 700 is to display notifications for alerts of the email application is set to an OFF state. In some embodiments, an OFF state of a parameter that determines whether notifications associated with alerts of an application are displayed causes the option to set other parameters associated with that application to be inactivated or disabled. In the example depicted in FIG. 9E, representations 920, 930, and 940 are de-emphasized to indicate that the parameters they represent cannot be changed.

Figure 9F:
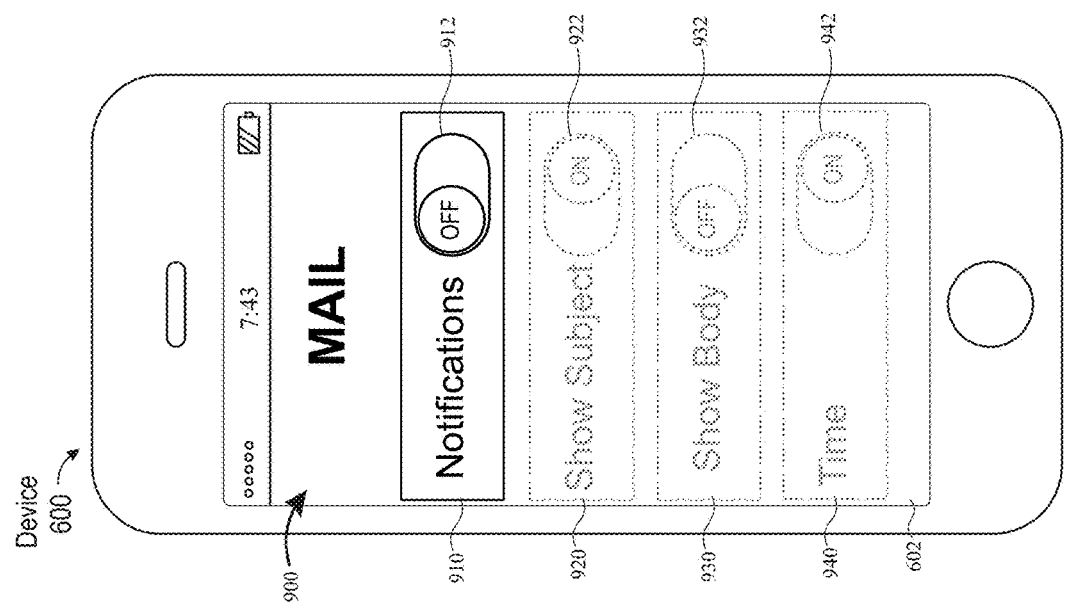

In some embodiments, device 600 inactivates or disables the option to set remote notification parameters when device 600 is out of communication range, or otherwise not in communication with, external device 700. That is, in accordance with a determination that device 600 is not in communication with external device 700, the option to set the state of a remote notification parameter is inactivated. FIG. 9F depicts an example of user interface 900 when device 600 is not in communication with external device 700. In FIG. 9F, user interface 900 includes an indication 970 that device 600 is not in communication with external device 700, and representations 910, 920, 930, and 940 are inactivated.

In some embodiments, device 600 displays a user interface that includes an option to set a state of a parameter that affects the display of notifications on device 600. Such a parameter is referred to in this disclosure as a local notification parameter, as it affects local notifications. In some embodiments, local notifications are to be displayed on device 600 in accordance with local notification parameters. FIG. 10A depicts an exemplary user interface 1000 including options to set the states of local notification parameters. User interface 1000 includes representation 1010 of an email application and representation 1020 of a text messaging application. Representations 1010 and 1020 are associated with local notification parameters and are analogous to representations 810 and 820 discussed above with respect to remote notification parameters. The positions of switches 1012 and 1022 indicate the states of local notification parameters that determine whether alerts of the email application and text messaging application, respectively, are to be displayed on device 600. In some embodiments, representation 1010 is associated with one or more of the email applications associated with representation 810, and representation 1020 is associated with one or more of the text messaging applications associated with representation 820.

While displaying user interface 1000, device 600 can detect a user input representing a selection of a state of one or more of the represented local notification parameters. In some embodiments, the user input is a contact on touch-sensitive display 602 at a location associated with a local notification parameter (e.g., the location of switch 1012 of representation 1010). In some embodiments, the contact is caused by a touch gesture such as touch 850 discussed above with reference to FIG. 8A. In response to detecting the user input, device 600 can set the local notification parameter to the selected state.

Local notifications may be displayed on display 602 of device 600 in accordance with the state of the local notification parameters associated with representations 1010 and 1020. For example, in FIG. 10A, the local notification parameter associated with the email application is ON and the local notification parameter associated with the text messaging application is OFF. In accordance with this configuration, device 600 displays notifications representing the alerts of the email application but not those of the text messaging application. As depicted in FIG. 10B, in accordance with this configuration, device 600 displays notification 620 associated with an alert of the email application, but does not display notification 610 shown in FIG. 7A.

Returning to FIG. 10A, user interface 1000 also includes representations 810 and 820 described above with respect to remote notification parameters for the email and text messaging applications associated with representations 1010 and 1020. The remote notification parameter associated with representation 810 and the local notification parameter associated with representation 1010 are associated with the same notification setting. Notification settings include settings that are not specific to either device 600 or external device 700, such as whether to display notifications for a particular application installed on both devices.

In some embodiments, a remote notification parameter associated with a setting, function, and/or application can be set independently from a corresponding local notification parameter for the same setting, function, and/or application. For example, user interface 1000 depicts a configuration in which the local notification parameters associated with an email application and a text messaging application are set to different states than the corresponding remote notification parameters associated with the same applications. FIG. 10C depicts the display of external device 700 in accordance with the configuration of parameters set on user interface 1000. As shown, external device 700 displays a notification for a different alert than device 600.

It should be recognized that any combination of states for the parameters associated with representations 810, 820, 1010, and 1020 is possible. In some embodiments, device 600 displays notifications for the same set of alerts as external device 700; in some embodiments, device 600 displays notifications for a subset of the alerts for which external device 700 displays notifications; in some embodiments, external device 700 displays notification for a subset of the alerts for which device 600 displays notifications; in some embodiments, device 600 displays one or more notifications of one or more alerts for which external device 700 does not display a notification; in some embodiments, external device 700 displays one or more notifications for one or more alerts for which device 600 does not display a notification; in some embodiments, device 600 and external device 700 do not display a notification for any of the same alerts.

It should also be recognized that the features that may be associated with adjustable notification parameters (both local and remote) are not limited to those described above, and that techniques described above may apply to various other notification features. In some embodiments, in accordance with the state of a notification setting, device 600 or external device 700 display notifications based on at least a portion of the information of the alert, such as the source or the alert, the content of the alert, the application associated with the alert, a priority of the alert, an event associated with the alert, a time associated with the alert, a location associated with the alert, a person associated with the alert, etc. For example, a notification parameter may be used to determine whether to display notifications for alerts associated with a particular source (e.g., a device or user).

Further examples of notification features that may be configured include the size, shape, color, or location of a notification, an animation of the notification, an ability to interact with a notification, a duration of display of a notification, the accessibility or availability of a notification, audio or haptic indications accompanying an indication, etc. Such exemplary features may be based at least in part on the state of notification parameters associated with these features.

It should also be recognized that the techniques described above may be applied to various other features of device 600 or external device 700 other than notifications. For example, various other operational functions and/or features may be performed in accordance with the settings of adjustable parameters.

FIG. 11 is a flow diagram illustrating a method for 1100 using an electronic device in accordance with some embodiments. Method 1100 is performed at a device (e.g., 100, 300, 500, 600) with a display. Some operations in method 1100 may be combined, the order of some operations may be changed, and some operations may be omitted.

As described below, method 1100 provides an intuitive way for configuring an electronic device. The method reduces the cognitive burden on a user for configuring an electronic device, thereby creating a more efficient human-machine interface. For battery-operated computing devices, enabling a user to configure an electronic device faster and more efficiently conserves power and increases the time between battery charges.

At block 1102, the device (e.g., 600) receives a plurality of alerts comprising information.

At block 1104, in response to receiving the plurality of alerts, the device (e.g., 600) displays local notifications (e.g., 610, 620) on the first display (e.g., 602) corresponding to the first set of alerts of the plurality of alerts.

At block 1106, further in response to receiving the plurality of alerts, the device (e.g., 600) sends data representing at least a portion of the plurality of alerts. The data includes instructions to cause a second device (e.g., 700) to display remote notifications (e.g., 710, 720) on the second display corresponding to a second set of alerts of the at least a portion of the plurality of alerts. Optionally, the second device (e.g., 700) is remote from the device (e.g., 600) and is in a paired relationship with the device (e.g., 600).

Note that details of the processes described above with respect to method 1100 (e.g., FIG. 11) are also applicable in an analogous manner to the methods described below. For example, methods 1400 and 1800 may include one or more of the characteristics of the various methods described above with reference to method 1100.

Figure 12:
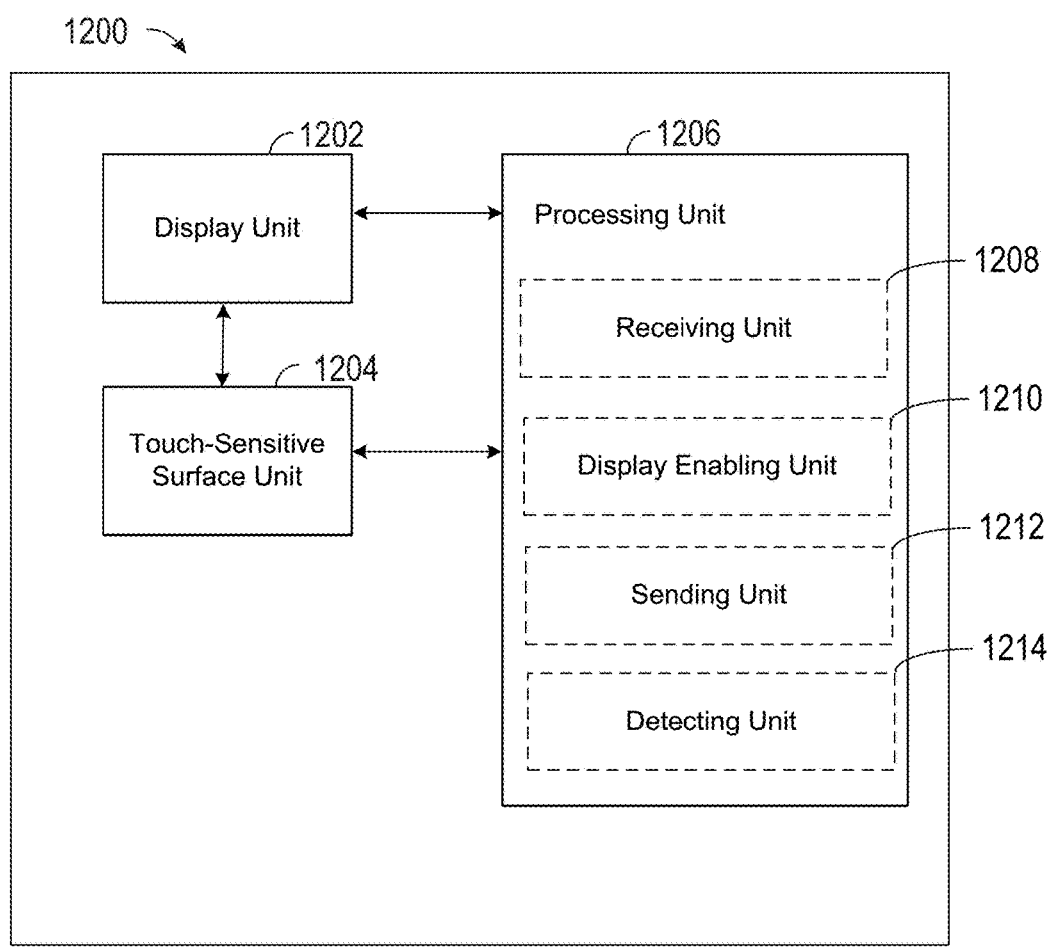
FIG. 12 is a functional block diagram of an electronic device in accordance with some embodiments.

In accordance with some embodiments, FIG. 12 shows an exemplary functional block diagram of an electronic device 1200 configured in accordance with the principles of the various described embodiments. In accordance with some embodiments, the functional blocks of electronic device 1200 are configured to perform the techniques described above. The functional blocks of the device 1200 are, optionally, implemented by hardware, software, or a combination of hardware and software to carry out the principles of the various described examples. It is understood by persons of skill in the art that the functional blocks described in FIG. 12 are, optionally, combined or separated into sub-blocks to implement the principles of the various described examples. Therefore, the description herein optionally supports any possible combination or separation or further definition of the functional blocks described herein.

As shown in FIG. 12, an electronic device 1200 includes a display unit 1202 configured to display a graphic user interface, optionally, a touch-sensitive surface unit 1204 configured to receive contacts, and a processing unit 1206 coupled to the display unit 1202 and, optionally, the touch-sensitive surface unit 1204. In some embodiments, the processing unit 1206 includes a receiving unit 1208, a display enabling unit 1210, a sending unit 1212, and a detecting unit 1214.

The processing unit 1206 is configured to receive (e.g., with receiving unit 1208) a plurality of alerts comprising information. The processing unit 1206 is further configured to, in response to receiving the plurality of alerts, enable (e.g., with display enabling unit 1210) display of local notifications on the display unit corresponding to a first set of alerts of the plurality of alerts, and send (e.g., with sending unit 1212) data representing at least a portion of the plurality of alerts. The data includes instructions to cause a second electronic device with a second display unit to display remote notifications on the second display unit corresponding to a second set of alerts of the at least a portion of the plurality of alerts. The second electronic device is remote from the electronic device and is in a paired relationship with the electronic device.

In some embodiments, the first set of alerts is different than the second set of alerts. In some embodiments, the second set of alerts is a subset of the first set of alerts.

In some embodiments, the local notifications comprise a first local notification including a first portion of the information of a first alert, where the remote notifications include a first remote notification including a second portion of the information of the first alert that is different than the first portion.

In some embodiments, the processing unit 1206 is further configured to enable (e.g., with display enabling unit 1210) display of a user interface including an option to set a state of a remote notification parameter, where the remote notifications are to be displayed on the second display in accordance with the remote notification parameter;

In some embodiments, the processing unit 1206 is further configured to detect (e.g., with detecting unit 1214) a user input, where the user input represents a selected state of the remote notification parameter, and send (e.g., with sending unit 1212) data that includes instructions to cause the second electronic device to set the remote notification parameter on the second electronic device to the selected state of the remote notification parameter. In some embodiments, the remote notification parameter is associated with a first notification setting. In some embodiments, the processing unit 1206 is further configured to enable (e.g., with display enabling unit 1210) display of a user interface including an option to set a state of a local notification parameter associated with the first notification setting, and detect (e.g., with detecting unit 1214) a user input, where the user input represents a selected state of the local notification parameter. In some embodiments, the local notifications are to be displayed on the first display in accordance with the local notification parameter. In some embodiments, the selected state of the local notification parameter is different than the selected state of the remote notification parameter.

In some embodiments, in accordance with the state of the notification setting, notifications are displayed based on at least a portion of the information of the alert. In some embodiments, the format of the notification is based at least in part on the state of the notification setting. In some embodiments, in accordance with a determination that the first electronic device is not in communication with the second electronic device, the option to set the state of the remote notification parameter is inactivated.

The operations described above with reference to FIG. 11 are, optionally, implemented by components depicted in FIGS. 1A-1B or FIG. 12. For example, receiving operation 1102, displaying operation 1104, and sending operation 1106 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

2. Configuration Mirroring

Figure 13:
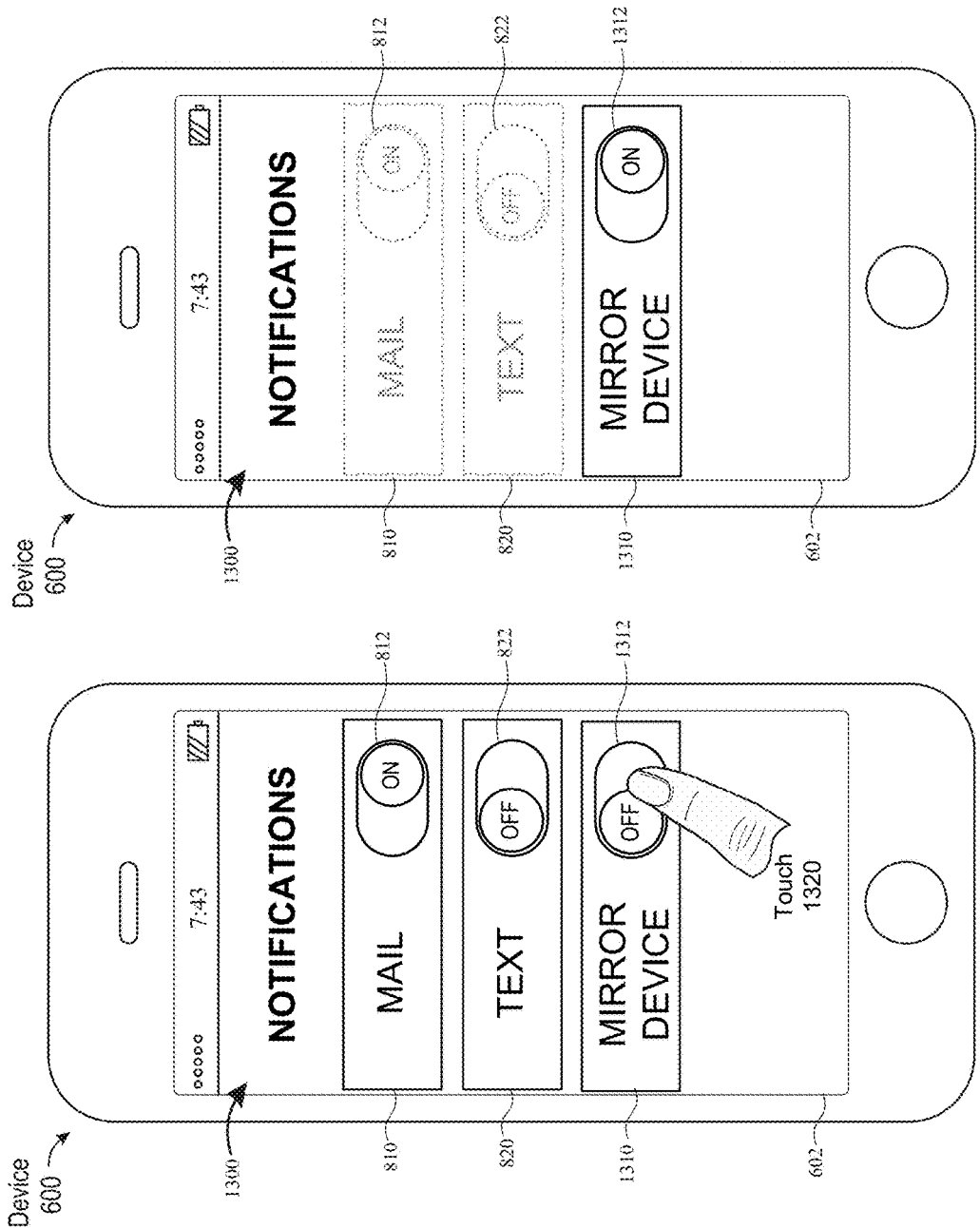
FIGS. 13A-13B illustrate exemplary user interfaces in accordance with some embodiments.
Figure 14:
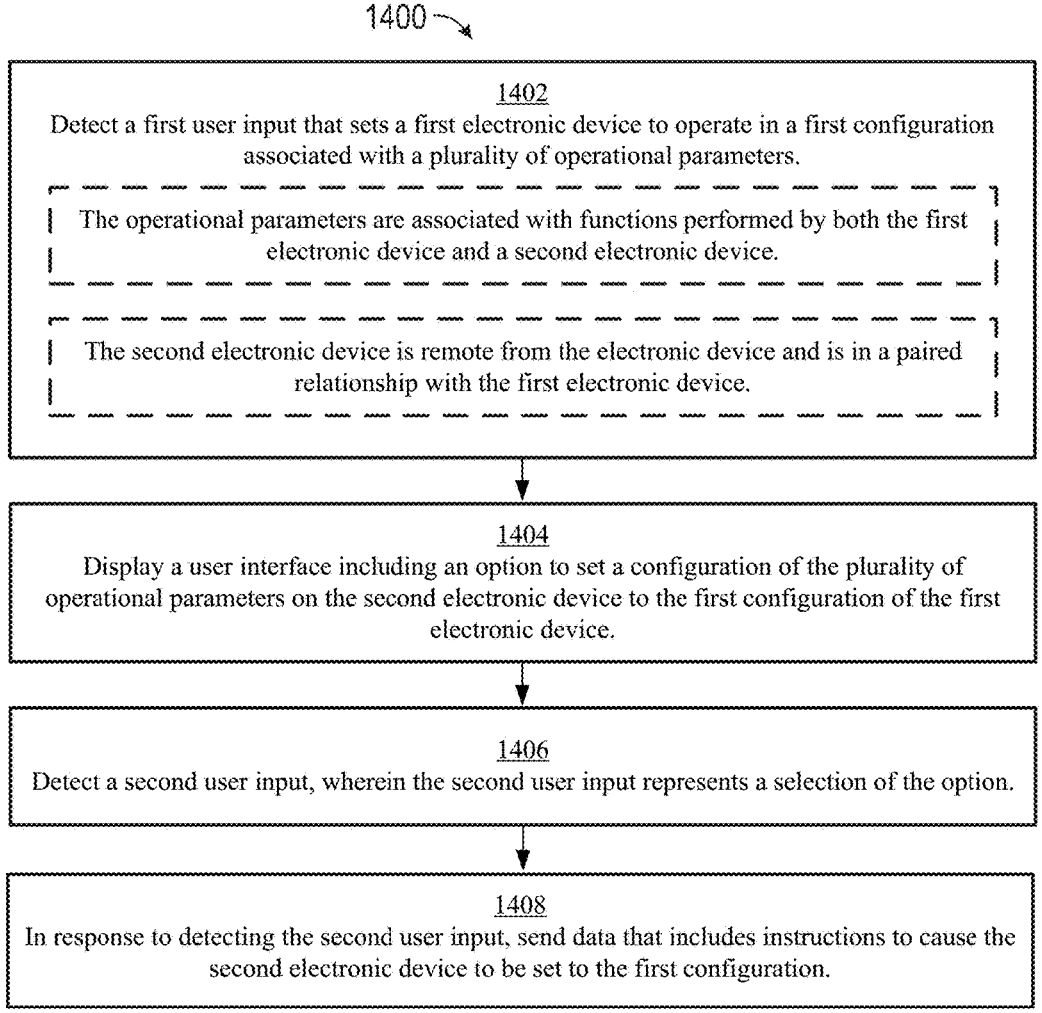
FIG. 14 is a flow diagram illustrating a process for configuring an electronic device in accordance with some embodiments.

FIGS. 13A-13B illustrate exemplary user interfaces for mirroring the configuration of one device on another device, in accordance with some embodiments. The user interfaces in these figures are used to illustrate the processes described below, including the processes in FIG. 14.

In some embodiments, device 600 displays a user interface that includes an option to mirror the configuration (e.g., settings, operational parameters, etc.) of device 600 on device 700. For the purposes of this disclosure, "mirroring" means that the external device 700 is configured to operate in the same manner as device 600 with respect to as least some operations that can be performed by both devices. Mirroring may include using the same settings of operational parameters (e.g., notification parameters) for both device 600 and external device 700.

In some embodiments, device 600 detects a user input that sets device 600 to operate in a particular configuration. For example, 600 may detect a selection for a state of one of the local notification parameters associated with representations 1010 or 1020 described above with respect to FIG. 10A. In some embodiments, the configuration of device 600 includes one or more operational parameters of device 600 other than notification parameters. Exemplary operational parameters include, but are not limited to, application settings, operating system settings, airplane mode, Bluetooth settings, do not disturb settings, notification settings (e.g., local notification parameters associated with representations 1010 or 1020), or the like. The operational parameters may be associated with functions performed by both device 600 and device 700. That is, the parameters relate to features, functions, operations, or the like, that are common to both devices. In some embodiments, the functions performed by both device 600 and device 700 include an airplane mode, Bluetooth functions, application functions, or operating system functions.

FIG. 13A depicts a user interface 1300 displayed on device 600 that includes an option to mirror the settings of device 600 on external device 700. That is, user interface 1300 includes an option to set a configuration of the operational parameters on the external device 700 to the configuration of device 600. User interface 1300 includes representations 810 and 820 described above with respect to FIG. 8A. In addition, user interface 1300 includes representation 1310, which indicates the state of a mirror device parameter that determines whether the settings of device 600 are mirrored on external device 700. A user can interact with representation 1320 to set the state of the mirror device parameter to either on or off. The state may be set in response to various types of inputs, including, for example, the inputs described with respect to the parameter representations discussed above (e.g., 810, 820). In some embodiments, the state of the mirror device parameter is set in response to a contact detected on touch sensitive display 602 at a location corresponding to representation 1310 (e.g., a contact caused by a tap, swipe, drag, or flick on switch 1312).

As depicted in FIG. 13A, device 600 detects a user input, touch 1320, representing a selection of the option to mirror the settings of device 600 on device 700. In response to detecting the user input, device 600 sends data with instructions to cause device 700 to be set to the configuration of device 600. Device 700 may receive the data, and in accordance with the instructions, set the configuration of device 700 to mirror device 600.

In response to detecting the user input, device 600 may also update switch 1312 to reflect the state of the mirror device parameter. In some embodiments, in response to the mirror device parameter being set to the ON state, device 600 disables the ability to adjust other parameters of external device 700. In some embodiments, device 600 displays an indication that other external device parameters cannot be adjusted. For example, as depicted in FIG. 13B, device 600 can de-emphasize representations 810 and 820.

FIG. 14 is a flow diagram illustrating a method for configuring an electronic device using another electronic device in accordance with some embodiments. Method 1400 is performed at a device (e.g., 100, 300, 500, 600) with a display. Some operations in method 1400 may be combined, the order of some operations may be changed, and some operations may be omitted.

As described below, method 1400 provides an intuitive way for configuring an electronic device. The method reduces the cognitive burden on a user for configuring an electronic device, thereby creating a more efficient human-machine interface. For battery-operated computing devices, enabling a user to configure an electronic device faster and more efficiently conserves power and increases the time between battery charges.

At block 1402, the device (e.g., 600) detects a first user input that sets the device to operate in a first configuration associated with a plurality of operational parameters. The operational parameters are associated with functions performed by both the device (e.g., 600) and a second device (e.g., 700). Optionally, the second device (e.g., 700) is remote from the electronic device and is in a paired relationship with the first electronic device.

At block 1404, the device (e.g., 600) displays a user interface (e.g., 1300) including an option (e.g., 1310) to set a configuration of the plurality of operational parameters on the second device (e.g., 700) to the first configuration of the device (e.g., 600).

At block 1406, the device (e.g., 600) detects a second user input, wherein the second user input represents a selection of the option.

At block 1408, in response to detecting the second user input, the device (e.g., 600) sends data that includes instructions to cause the second device (e.g., 700) to be set to the first configuration.

Note that details of the processes described above with respect to method 1400 (e.g., FIG. 14) are also applicable in an analogous manner to the other methods described herein. For example, methods 1100 and 1800 may include one or more of the characteristics of the various methods described above with reference to method 1400.

Figure 15:
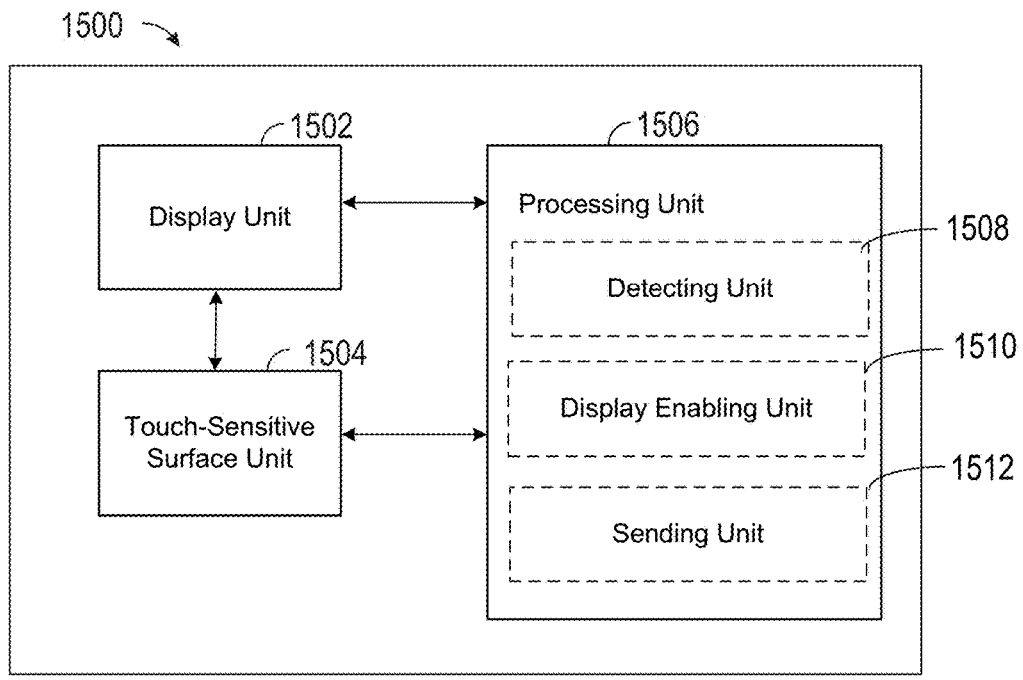
FIG. 15 is a functional block diagram of an electronic device in accordance with some embodiments.

In accordance with some embodiments, FIG. 15 shows an exemplary functional block diagram of an electronic device 1500 configured in accordance with the principles of the various described embodiments. In accordance with some embodiments, the functional blocks of electronic device 1500 are configured to perform the techniques described above. The functional blocks of the device 1500 are, optionally, implemented by hardware, software, or a combination of hardware and software to carry out the principles of the various described examples. It is understood by persons of skill in the art that the functional blocks described in FIG. 15 are, optionally, combined or separated into sub-blocks to implement the principles of the various described examples. Therefore, the description herein optionally supports any possible combination or separation or further definition of the functional blocks described herein.

As shown in FIG. 15, an electronic device 1500 includes a display unit 1502 configured to display a graphic user interface, optionally, a touch-sensitive surface unit 1504 configured to receive contacts, and a processing unit 1506 coupled to the display unit 1502 and, optionally, the touch-sensitive surface unit 1504. In some embodiments, the processing unit 1506 includes a detecting unit 1508, a display enabling unit 1510, and a sending unit 1512.

The processing unit 1506 is configured to detect (e.g., with detecting unit 1508) a first user input that sets the electronic device to operate in a first configuration associated with a plurality of operational parameters. The operational parameters are associated with functions performed by the electronic device and a second electronic device remote from the electronic device and in a paired relationship with the electronic device. The processing unit 1506 is further configured to enable (e.g., with display enabling unit 1510) display of a user interface including an option to set a configuration of the plurality of operational parameters on the second electronic device to the first configuration of the electronic device. The processing unit 1506 is further configured to detect (e.g., with detecting unit 1508) a second user input, where the second user input represents a selection of the option. The processing unit 1506 is further configured to, in response to detecting the second user input, send (e.g., with sending unit 1512) data that includes instructions to cause the second electronic device to be set to the first configuration.

In some embodiments, the functions performed by both the electronic device and the second electronic device include an airplane mode. The electronic device of any one of claims 10-11, wherein the functions performed by both the electronic device and the second electronic device include Bluetooth functions. In some embodiments, the functions performed by both the electronic device and the second electronic device include application functions. In some embodiments, the functions performed by both the electronic device and the second electronic device include operating system functions.

The operations described above with reference to FIG. 14 are, optionally, implemented by components depicted in FIGS. 1A-1B or FIG. 15. For example, detecting operations 1402 and 1406, displaying operation 1404, and sending operation 1408 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

3. Configuring an Arrangement of Graphical Objects

Figure 16:
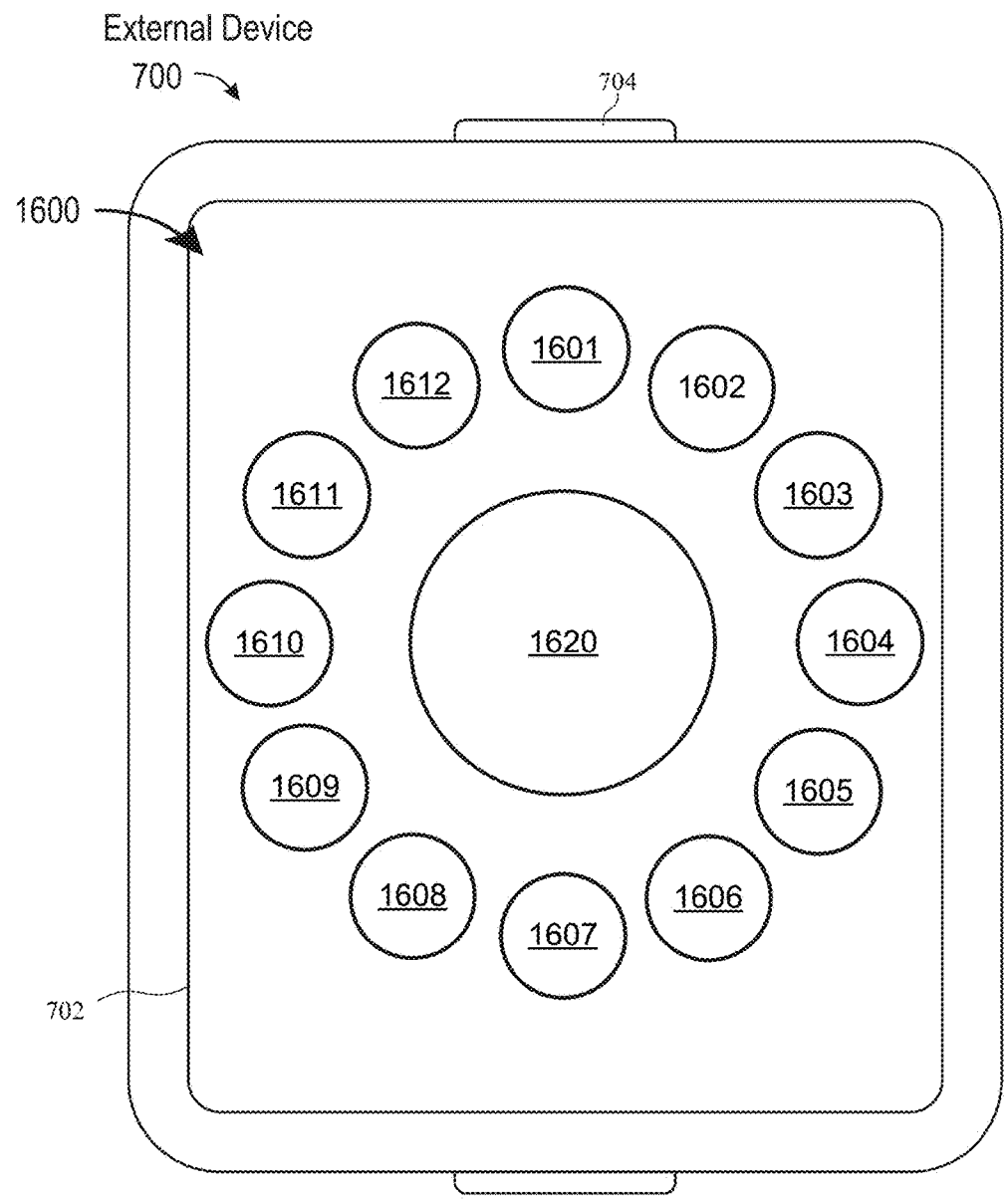

FIGS. 16-17B illustrate exemplary user interfaces for configuring an arrangement of graphical objects displayed on an external device, in accordance with some embodiments. The user interfaces in these figures are used to illustrate the processes described below, including the processes in FIG. 18.

FIG. 16 depicts an exemplary user interface 1600 displayed on external device 700. User interface 1600 includes an exemplary arrangement of locations 1601-1612 on display 702. In some embodiments, a graphical object is displayed at one or more of the locations. In some embodiments, the locations 1601-1612 are arranged in a predetermined pattern. FIG. 16 depicts a pattern in which the locations are equally spaced at a constant distance around a central point (e.g., in a circular pattern). User interface 1600 also includes a larger central location 1620. In some embodiments, a larger or more detailed graphical object associated with one of the other locations 1601-1612 is displayed at location 1620. For example, an image of a contact associated with one of the locations 1601-1612 may be displayed at location 1620 in response to a user selection of one of the locations 1601-1612.

It should be recognized that user interface 1600 provides only one exemplary arrangement of locations and that there can be a different number of locations with various alternative arrangements, locations, sizes, etc. Furthermore, graphical objects displayed at the locations can have various sizes, colors, formats, styles, etc. Exemplary user interfaces including an arrangement of locations are also described in co-pending U.S. Provisional Patent Application titled "Electronic Touch Communication," filed Mar. 8, 2015, naming Freddy Allen Anzures et al. as inventors.

In some embodiments, device 600 displays a user interface for allowing a user to configure user interface 1600 by associating an object with one or more of the locations 1601-1612 displayed on external device 700. In some embodiments, the object represents a contact, person, place, business, item, activity, etc. In the examples described below, personal contacts are associated with one or more of the locations 1601-1612. In some embodiments, associating an object with a location causes a graphical object indicative of the object to be displayed at the corresponding location. In some embodiments, a graphical object including initials of a contact is displayed at the associated location.

FIG. 17A depicts exemplary user interface 1700, which includes representations 1701-1712 of the locations 1601-1612 on display 702 of external device 700. Exemplary representations 1701-1707 corresponding to locations 1601-1607. In some embodiments, representations 1708-1712 corresponding to locations 1608-1612 can be displayed by scrolling user interface 1700 upward.

In FIG. 17A, representations 1701-1712 include graphical indications of the positions of the corresponding locations on display 702 of external device 700. Representation 1701, for example, includes graphical indication 1720, which includes a circular pattern 1722 and a dot 1724. The circular pattern 1722 provides an indication of the pattern of the locations 1601-1612. The circular pattern 1722 also includes twelve dashes, each one corresponding to the position of one of the locations 1601-1612 on display 702. The dot 1724 indicates the position of location 1601, the location associated with representation 1701. In some embodiments, the dot 1724, or some other portion of indication 1720, includes a color that matches a color associated with location 1601. In some embodiments, the color associated with location 1601 includes a color of a graphical object displayed at location 1601.

A representation may be associated with an affordance that represents a contact. In FIG. 17A, representation 1701 includes an affordance 1730 associated with a contact named Alex. Optionally, when activated, the affordance 1730 displays the contact's information and various options (e.g., email, message, call, etc.). Affordance 1730 includes an image 1732 associated with the contact and two textual indications 1734 and 1736 of the contact. As depicted in FIG. 17A, the image 1732 may be a picture of the contact, and the textual indicators may include a name 1734 of the contact and initials 1736 associated with the name of the contact.

In some embodiments, device 600 can detect a user input on the touch-sensitive display 602. As shown depicted in FIG. 17A, for example, device 600 detects a contact (e.g., touch 1750) at a location corresponding to affordance 1730 at representation 1701. Device 600 can continue to detect the user input on display 602 and further detect movement of the user input from representation 1701 to a representation 1704 of a different location 1604 of the locations on display 702. In response to detecting the movement of the user input from representation 1701 to representation 1704, the affordance of the contact is associated with location 1604 on display 702. As depicted in FIG. 17B, in response to detecting the movement of the user input from representation 1701 to representation 1704, device 600 ceases to display the affordance of the contact at representation 1701 and displays it at representation 1704 on display 602.

In some embodiments, device 600 provides an option to remove an affordance from user interface 1700 or disassociate a contact from a location on display 702. For example, device 600 may detect a user input associated with an affordance of a contact displayed on user interface 1700. In response to detecting the user input, device 600 may cease displaying the affordance associated with the contact. In some embodiments, in response to detecting the user input, device 600 ceases associating the contact with its corresponding location on display 702. In some embodiments, in response to detecting the user input, device 600 sends data including instructions that, when executed, cause external device 700 to cease associating the contact with any of the locations 601 and cease displaying graphical objects associated with the contact.

In some embodiments, device 600 provides an option to associate an additional affordance with a location on display 702. In some embodiments, device 600 detects a user input on touch-sensitive display 602 that represents a selection of a location on display 702 that is not currently associated with a contact. For example, device 600 may detect a touch at representation 1702 in FIG. 17B. In response to detecting the user input, device 600 may display a representation (e.g., a menu or list) of one or more contacts. Device 600 may then detect a user input representing a selection of a contact. In response to detecting the selection of the contact, device 600 may display an affordance of the selected contact at the representation associated with the selected location.

FIG. 18 is a flow diagram illustrating a method for configuring a display of an electronic device using another electronic device in accordance with some embodiments. Method 1800 is performed at a device (e.g., 100, 300, 500, 600) with a touch-sensitive display. Some operations in method 1800 may be combined, the order of some operations may be changed, and some operations may be omitted.

As described below, method 1800 provides an intuitive way for configuring a display of an electronic device. The method reduces the cognitive burden on a user for configuring a display of an electronic device, thereby creating a more efficient human-machine interface. For battery-operated computing devices, enabling a user to configure a display of an electronic device faster and more efficiently conserves power and increases the time between battery charges.

At block 1802, the device (e.g., 600) displays a user interface (e.g., 1700) on the touch-sensitive display (e.g., 602). The user interface includes one or more representations (e.g., 1701-1712) of one or more locations (e.g., 1601-1612) on a second display (e.g., 702) of a second device (e.g., 700). The second device (e.g., 700) is in a paired relationship with the device (e.g., 600). The second device (e.g., 700) is remote from the device (e.g., 600).

At block 1804, the device (e.g., 600) detects a user input on the touch-sensitive display (e.g., 602) at a representation (e.g., 1701) of a first location (e.g., 1601) of the one or more locations on the second display (e.g., 702). The representation of the first location includes an affordance (e.g., 1730).

At block 1806, while continuing to detect the user input on the touch-sensitive display, the device (e.g., 600) detects movement of the user input from the representation of the first location (e.g., 1701) of the one or more locations on the second display to a representation of a second location (e.g., 1704) of the one or more locations on the second display.

At block 1808, in response to detecting the movement of the user input from the representation of the first location to the representation of the second location, the device (e.g., 600) associates the affordance (e.g., 1730) with the second location on the second display (e.g., 1604).

Note that details of the processes described above with respect to method 1800 (e.g., FIG. 18) are also applicable in an analogous manner to the methods described above. For example, methods 1100 and 1400 may include one or more of the characteristics of the various methods described above with reference to method 1800.

Figure 19:
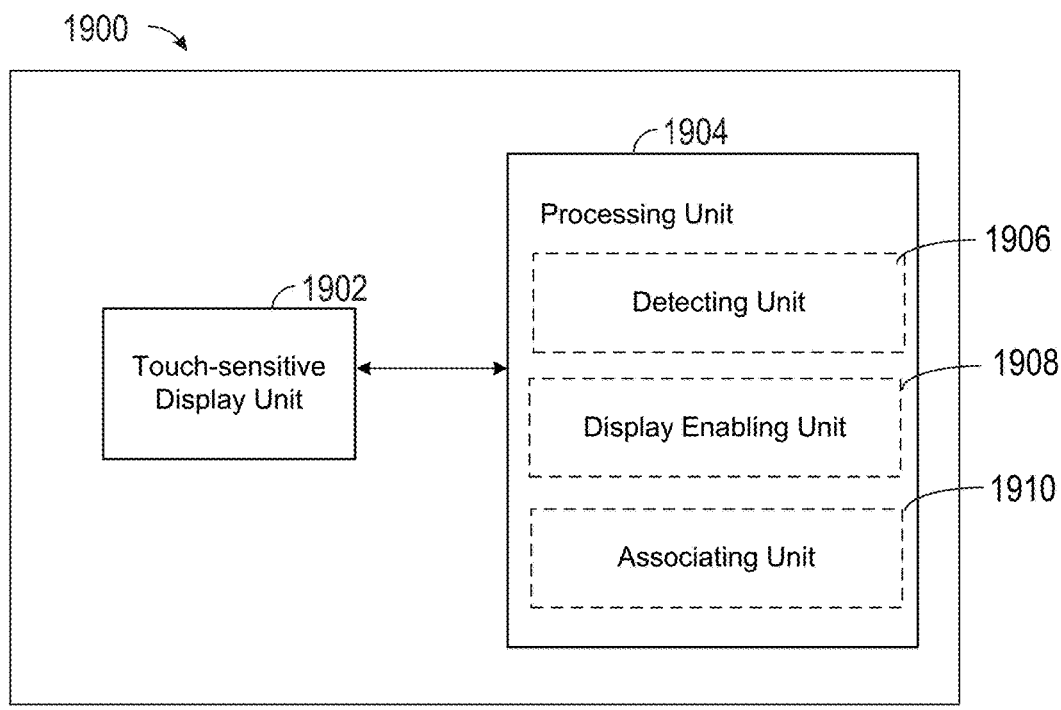
FIG. 19 is a functional block diagram of an electronic device in accordance with some embodiments.

In accordance with some embodiments, FIG. 19 shows an exemplary functional block diagram of an electronic device 1900 configured in accordance with the principles of the various described embodiments. In accordance with some embodiments, the functional blocks of electronic device 1900 are configured to perform the techniques described above. The functional blocks of the device 1900 are, optionally, implemented by hardware, software, or a combination of hardware and software to carry out the principles of the various described examples. It is understood by persons of skill in the art that the functional blocks described in FIG. 19 are, optionally, combined or separated into sub-blocks to implement the principles of the various described examples. Therefore, the description herein optionally supports any possible combination or separation or further definition of the functional blocks described herein.

As shown in FIG. 19, an electronic device 1900 includes a touch-sensitive display unit 1902 configured to display a graphic user interface and receive contacts, and a processing unit 1904 coupled to the display unit 1902. In some embodiments, the processing unit 1904 includes a detecting unit 1906, a display enabling unit 1908, and an associating unit 1910.

The processing unit 1904 is configured to enable (e.g., with display enabling unit 1908) display of a user interface on the touch-sensitive display, where the user interface includes one or more representations of one or more locations on a second display of a second electronic device. The second electronic device is remote from the electronic device 1900 and is in a paired relationship with the electronic device 1900. The processing unit 1904 is further configured to detect (e.g., with detecting unit 1906) a user input on the touch-sensitive display unit 1902 at a representation of a first location of the one or more locations on the second display, where the representation of the first location includes an affordance. The processing unit 1904 is further configured to, while continuing to detect the user input on the first touch-sensitive display, detect (e.g., with detecting unit 1906) movement of the user input from the representation of the first location of the one or more locations on the second display to a representation of a second location of the one or more locations on the second display. The processing unit 1904 is further configured to, in response to detecting the movement of the user input from the representation of the first location to the representation of the second location, associate (e.g., with associating unit 1910) the affordance with the second location on the second display.

In some embodiments, the representation of the first location includes a graphical indication of the position on the second display of the first location. In some embodiments, a color of the indication matches a color associated with the first location on the second display.

In some embodiments, the affordance is associated with a contact. In some embodiments, the affordance includes an image associated with the contact. In some embodiments, the affordance includes one or more textual indications of the contact. In some embodiments, the one or more textual indications include a name of the contact. In some embodiments, the one or more textual indications include initials associated with the name of the contact.

In some embodiments, the user interface includes a representation of a third location of the one or more locations on the second display, and the representation of the third location includes a second affordance associated with a second contact. In some embodiments, the processing unit 1904 is further configured to detect (e.g., with detecting unit 1906) a second user input and, in response to detecting the second user input, enable ceasing display of the second affordance associated with the second contact.

In some embodiments, the processing unit 1904 is further configured to, before detecting the first user input, detect (e.g., with detecting unit 1906) a third user input on the first touch-sensitive display at a representation of a fourth location of the one or more locations on the second display and, in response to detecting the third user input, enable (e.g., with display enabling unit 1908) display of a representation of one or more contacts. The processing unit 1904 is further configured to detect (e.g., with detecting unit 1906) a fourth user input on the first touch-sensitive display representing a selection of a third contact of the one or more contacts, and, in response to detecting the selection of the third contact, enable (e.g., with display enabling unit 1908) display of a third affordance at the representation of the fourth location of the one or more locations on the second display, wherein the third affordance represents the third contact.

In some embodiments, the one or more locations on the second display include a plurality of locations arranged in a predetermined pattern. In some embodiments, the one or more representations of the one or more locations on the second display include an indication of the predetermined pattern. In some embodiments, the plurality of locations on the second display are equally spaced at a constant distance around a central point.

The operations described above with reference to FIG. 18 are, optionally, implemented by components depicted in FIGS. 1A-1B or FIG. 19. For example, displaying operation 1802, detecting operations 1804 and 1806, and associating operation 1808 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

What is claimed is:

1. A non-transitory computer-readable storage medium storing one or more programs, the one or more programs comprising instructions, which when executed by one or more processors of a first electronic device with a first touch-sensitive display, cause the first electronic device to:
display a user interface on the first touch-sensitive display, wherein the user interface includes a representation of a first location on a second display of a second electronic device and a representation of a second location on the second display of the second electronic device, wherein the second electronic device is in a paired relationship with the first electronic device, and wherein the second electronic device is remote from the first electronic device;
detect a user input on the first touch-sensitive display at the representation of the first location, wherein the representation of the first location includes an affordance;
while continuing to detect the user input on the first touch-sensitive display, detect movement of the user input on the first touch-sensitive display from the representation of the first location to the representation of the second location; and
in response to detecting the movement of the user input on the first touch-sensitive display from the representation of the first location to the representation of the second location, associate the affordance with the second location on the second display.

2. The non-transitory computer-readable storage medium of claim 1, wherein the representation of the first location includes a graphical indication of the position on the second display of the first location.

3. The non-transitory computer-readable storage medium of claim 2, wherein a color of the indication matches a color associated with the first location on the second display.

4. The non-transitory computer-readable storage medium of claim 1, wherein the affordance is associated with a contact.

5. The non-transitory computer-readable storage medium of claim 4, wherein the affordance includes an image associated with the contact.

6. The non-transitory computer-readable storage medium of claim 4, wherein the affordance includes one or more textual indications of the contact.

7. The non-transitory computer-readable storage medium of claim 6, wherein the one or more textual indications include a name of the contact.

8. The non-transitory computer-readable storage medium of claim 7, wherein the one or more textual indications include initials associated with the name of the contact.

9. The non-transitory computer-readable storage medium of claim 1, wherein the user interface includes a representation of a third location of the one or more locations on the second display, wherein the representation of the third location includes a second affordance associated with a second contact, and wherein the one or more programs further comprises instructions, which when executed by the one or more processors of the first electronic device, cause the first electronic device to:
detect a second user input; and
in response to detecting the second user input:
cease to display the second affordance associated with the second contact.

10. The non-transitory computer-readable storage medium of claim 1, wherein the one or more programs further comprises instructions, which when executed by the one or more processors of the first electronic device, cause the first electronic device to:
before detecting the first user input:
detect a third user input on the first display at a representation of a fourth location of the one or more locations on the second display;
in response to detecting the third user input, display a representation of one or more contacts;
detect a fourth user input on the first touch-sensitive display representing a selection of a third contact of the one or more contacts; and
in response to detecting the selection of the third contact, display a third affordance at the representation of the fourth location of the one or more locations on the second display, wherein the third affordance represents the third contact.

11. The non-transitory computer-readable storage medium of claim 1, wherein the one or more locations on the second display include a plurality of locations arranged in a predetermined pattern.

12. The non-transitory computer-readable storage medium of claim 11, wherein the one or more representations of the one or more locations on the second display include an indication of the predetermined pattern.

13. The non-transitory computer-readable storage medium of claim 11, wherein the plurality of locations on the second display are equally spaced at a constant distance around a central point.

14. A method, comprising:
at a first electronic device with a first touch-sensitive display, wherein the first electronic device is in a paired relationship with a second electronic device with a second display, and wherein the second electronic device is remote from the first electronic device:
displaying a user interface on the first touch-sensitive display, wherein the user interface includes a representation of a first location on the second display and a representation of a second location on the second display of the second electronic device;
detecting a user input on the first touch-sensitive display the representation of the first location, wherein the representation of the first location includes an affordance;
while continuing to detect the user input on the first touch-sensitive display, detecting movement of the user input on the first touch-sensitive display from the representation of the first location to the representation of the second location; and
in response to detecting the movement of the user input on the first touch-sensitive display from the representation of the first location to the representation of the second location, associating the affordance with the second location on the second display.

15. An electronic device, comprising:
a touch-sensitive display;
one or more processors; and
a memory storing one or more programs configured to be executed by the one or more processors, the one or more programs including instructions for:
displaying a user interface on the first touch-sensitive display, wherein the user interface includes a representation of a first location on a second display of a second electronic device and a representation of a second location on the second display of the second electronic device, wherein the second electronic device is in a paired relationship with the first electronic device, and wherein the second electronic device is remote from the first electronic device;

detecting a user input on the touch-sensitive display at the representation of the first location, wherein the representation of the first location includes an affordance;

while continuing to detect the user input on the touch-sensitive display, detecting movement of the user input on the first touch-sensitive display from the representation of the first location to the representation of the second location; and in response to detecting the movement of the user input on the first touch-sensitive display from the representation of the first location to the representation of the second location, associating the affordance with the second location on the second display.

16. The method of claim 14, wherein the representation of the first location includes a graphical indication of the position on the second display of the first location.

17. The method of claim 16, wherein a color of the indication matches a color associated with the first location on the second display.

18. The method of claim 14, wherein the affordance is associated with a contact.

19. The method of claim 18, wherein the affordance includes an image associated with the contact.

20. The method of claim 18, wherein the affordance includes one or more textual indications of the contact.

21. The method of claim 20, wherein the one or more textual indications include a name of the contact.

22. The method of claim 21, wherein the one or more textual indications include initials associated with the name of the contact.

23. The method of claim 14, wherein the user interface includes a representation of a third location of the one or more locations on the second display, and wherein the representation of the third location includes a second affordance associated with a second contact, the method further comprising:

detecting a second user input; and in response to detecting the second user input:
ceasing to display the second affordance associated with the second contact.

24. The method of claim 14, the method further comprising:

before detecting the first user input:
detecting a third user input on the first display at a representation of a fourth location of the one or more locations on the second display;

in response to detecting the third user input, displaying a representation of one or more contacts;

detecting a fourth user input on the first touch-sensitive display representing a selection of a third contact of the one or more contacts; and in response to detecting the selection of the third contact, displaying a third affordance at the representation of the fourth location of the one or more locations on the second display, wherein the third affordance represents the third contact.

25. The method of claim 14, wherein the one or more locations on the second display include a plurality of locations arranged in a predetermined pattern.

26. The method of claim 25, wherein the one or more representations of the one or more locations on the second display include an indication of the predetermined pattern.

27. The method of claim 25, wherein the plurality of locations on the second display are equally spaced at a constant distance around a central point.

28. The device of claim 15, wherein the representation of the first location includes a graphical indication of the position on the second display of the first location.

29. The device of claim 28, wherein a color of the indication matches a color associated with the first location on the second display.

30. The device of claim 15, wherein the affordance is associated with a contact.

31. The device of claim 30, wherein the affordance includes an image associated with the contact.

32. The device of claim 30, wherein the affordance includes one or more textual indications of the contact.

33. The device of claim 32, wherein the one or more textual indications include a name of the contact.

34. The device of claim 33, wherein the one or more textual indications include initials associated with the name of the contact.

35. The device of claim 15, wherein the user interface includes a representation of a third location of the one or more locations on the second display, and wherein the representation of the third location includes a second affordance associated with a second contact, the one or more programs further including instructions for:

detecting a second user input; and in response to detecting the second user input:
ceasing to display the second affordance associated with the second contact.

36. The device of claim 15, the one or more programs further including instructions for:

before detecting the first user input:
detecting a third user input on the first display at a representation of a fourth location of the one or more locations on the second display;

in response to detecting the third user input, displaying a representation of one or more contacts;

detecting a fourth user input on the first touch-sensitive display representing a selection of a third contact of the one or more contacts; and in response to detecting the selection of the third contact, displaying a third affordance at the representation of the fourth location of the one or more locations on the second display, wherein the third affordance represents the third contact.

37. The device of claim 15, wherein the one or more locations on the second display include a plurality of locations arranged in a predetermined pattern.

38. The device of claim 37, wherein the one or more representations of the one or more locations on the second display include an indication of the predetermined pattern.

39. The device of claim 37, wherein the plurality of locations on the second display are equally spaced at a constant distance around a central point.

* * * * *